(12) United States Patent
Sahbaee et al.

(10) Patent No.: US 10,441,909 B2
(45) Date of Patent: Oct. 15, 2019

(54) FILTER MEDIA INCLUDING ORIENTED FIBERS

(71) Applicant: Hollingsworth & Vose Company, East Walpole, MA (US)

(72) Inventors: Arash Sahbaee, Christiansburg, VA (US); Bruce Smith, Copper Hill, VA (US)

(73) Assignee: Hollingsworth & Vose Company, East Walpole, MA (US)

( * ) Notice: Subject to any disclaimer, the term of this patent is extended or adjusted under 35 U.S.C. 154(b) by 0 days.

(21) Appl. No.: 14/314,121

(22) Filed: Jun. 25, 2014

(65) Prior Publication Data

US 2015/0375150 A1    Dec. 31, 2015

(51) Int. Cl.
| | |
|---|---|
| *B01D 46/00* | (2006.01) |
| *B01D 39/00* | (2006.01) |
| *B01D 46/54* | (2006.01) |
| *B01D 39/16* | (2006.01) |
| *B01D 39/02* | (2006.01) |
| *B01D 46/02* | (2006.01) |

(Continued)

(52) U.S. Cl.
CPC ......... *B01D 46/0001* (2013.01); *B01D 39/02* (2013.01); *B01D 39/1623* (2013.01); *B01D 46/00* (2013.01); *B01D 46/023* (2013.01); *B01D 46/10* (2013.01); *B01D 46/521* (2013.01); *B01D 46/546* (2013.01)

(58) Field of Classification Search
CPC .............. B01D 39/163; B01D 39/1623; B01D 39/2017; B01D 39/2024; B01D 46/10; B01D 46/16; B01D 46/36; B01D 46/521–46/522; B01D 46/2089; B01D 46/0001; B01D 39/02; B01D 46/00

USPC ........ 55/486, 482, 527–528; 95/70, 90, 143, 95/287; 96/55, 74, 134, 142, 153

See application file for complete search history.

(56) References Cited

U.S. PATENT DOCUMENTS

| | | |
|---|---|---|
| 2,409,066 A | 10/1946 | Powell et al. |
| 2,500,690 A | 3/1950 | Lannan |

(Continued)

FOREIGN PATENT DOCUMENTS

| | | |
|---|---|---|
| CN | 1211935 A | 3/1999 |
| DE | 196 13 463 A1 | 10/1997 |

(Continued)

OTHER PUBLICATIONS

U.S. Appl. No. 14/042,210, filed Sep. 30, 2013, Healey et al.

(Continued)

*Primary Examiner* — Robert A Hopkins
(74) *Attorney, Agent, or Firm* — Wolf, Greenfield & Sacks, P.C.

(57) ABSTRACT

Filter media incorporating one or more filtration layers that include fibers including fiber portions orientated at a non-zero angle with respect to a surface of the filtration layer are provided. In some embodiments, at least a part of the fiber portions are positioned at an angle of at least 20 degrees (e.g., between 46 degrees and 90 degrees, or between 61 degrees and 90 degrees) with respect to a surface of the filtration layer or an outer or cover layer of the media. This orientation of fiber portions may result in an increased efficiency (e.g., average efficiency and/or initial efficiency) compared to similar filter media that do not include such oriented fiber portions.

25 Claims, 6 Drawing Sheets

(51) Int. Cl.
*B01D 46/10* (2006.01)
*B01D 46/52* (2006.01)

(56) References Cited

U.S. PATENT DOCUMENTS

| | | | |
|---|---|---|---|
| 2,862,542 A | 12/1958 | Norton | |
| 3,012,923 A | 12/1961 | Slayter | |
| 3,180,775 A | 4/1965 | Sexsmith et al. | |
| 3,214,323 A | 10/1965 | Russell et al. | |
| 3,616,031 A | 10/1971 | Fleissner et al. | |
| 3,616,035 A | 10/1971 | Baskerville et al. | |
| 3,949,128 A | 4/1976 | Ostermeier | |
| 4,089,783 A | 5/1978 | Holyoak | |
| 4,111,733 A | 9/1978 | Periers | |
| 4,576,853 A | 3/1986 | Vaughn et al. | |
| RE32,171 E | 6/1986 | van Turnhout | |
| 4,650,506 A | 3/1987 | Barris et al. | |
| 4,701,197 A | 10/1987 | Thornton et al. | |
| 4,874,399 A | 10/1989 | Reed et al. | |
| 4,874,457 A | 10/1989 | Swieringa et al. | |
| 4,925,560 A | 5/1990 | Sorrick | |
| 4,961,974 A | 10/1990 | Jones | |
| 5,084,178 A | 1/1992 | Miller et al. | |
| 5,098,767 A | 3/1992 | Linnersten | |
| 5,167,740 A | 12/1992 | Michaelis et al. | |
| 5,344,956 A | 9/1994 | Allewaert et al. | |
| 5,350,620 A | 9/1994 | Sundet et al. | |
| 5,397,632 A | 3/1995 | Murphy et al. | |
| 5,401,446 A | 3/1995 | Tsai et al. | |
| 5,491,016 A | 2/1996 | Kaiser et al. | |
| 5,558,924 A | 9/1996 | Taipei et al. | |
| 5,580,459 A | 12/1996 | Powers et al. | |
| 5,620,545 A | 4/1997 | Braun et al. | |
| 5,645,627 A | 7/1997 | Lifshutz et al. | |
| 5,656,368 A | 8/1997 | Braun et al. | |
| 5,672,399 A | 9/1997 | Kahlbaugh et al. | |
| 5,674,302 A | 10/1997 | Nakayama et al. | |
| 5,686,050 A | 11/1997 | Wadsworth et al. | |
| 5,785,725 A | 7/1998 | Cusick et al. | |
| 5,800,586 A | 9/1998 | Cusick et al. | |
| 5,804,512 A | 9/1998 | Lickfield et al. | |
| 5,814,219 A | 9/1998 | Friedmann et al. | |
| 5,820,645 A | 10/1998 | Murphy | |
| 5,830,311 A | 11/1998 | Braun et al. | |
| 5,855,783 A | 1/1999 | Shucosky et al. | |
| 5,858,045 A | 1/1999 | Stemmer et al. | |
| 5,955,174 A | 9/1999 | Wadsworth et al. | |
| 5,993,501 A | 11/1999 | Cusick et al. | |
| 5,993,580 A | 11/1999 | Nakayama et al. | |
| 6,030,428 A | 2/2000 | Ishino et al. | |
| 6,090,469 A | 7/2000 | Wadsworth et al. | |
| 6,146,436 A | 11/2000 | Hollingsworth et al. | |
| 6,171,684 B1 | 1/2001 | Kahlbaugh et al. | |
| 6,200,368 B1 | 3/2001 | Guerin et al. | |
| 6,315,805 B1 | 11/2001 | Strauss | |
| 6,322,615 B1 | 11/2001 | Chapman | |
| 6,397,458 B1 | 6/2002 | Jones et al. | |
| 6,397,632 B1 | 6/2002 | Meagher | |
| 6,398,847 B1 | 6/2002 | Jones et al. | |
| 6,409,806 B1 | 6/2002 | Jones et al. | |
| 6,416,562 B1 | 7/2002 | Shibuya et al. | |
| 6,428,610 B1 | 8/2002 | Tsai et al. | |
| 6,432,175 B1 | 8/2002 | Jones et al. | |
| 6,514,324 B1 | 2/2003 | Chapman | |
| 6,554,881 B1 | 4/2003 | Healey | |
| 6,562,112 B2 | 5/2003 | Jones et al. | |
| 6,627,563 B1 | 9/2003 | Huberty | |
| 6,635,136 B2 | 10/2003 | White et al. | |
| 6,656,400 B2 | 12/2003 | Veeser et al. | |
| 6,660,210 B2 | 12/2003 | Jones et al. | |
| 6,743,273 B2 | 6/2004 | Chung et al. | |
| 6,780,226 B1 | 8/2004 | Lifshutz et al. | |
| 6,808,551 B2 | 10/2004 | Jones et al. | |
| 6,808,553 B2 | 10/2004 | Kawano | |
| 6,821,321 B2 | 11/2004 | Chinn et al. | |
| 6,858,057 B2 | 2/2005 | Healey | |
| 6,867,156 B1 | 3/2005 | White et al. | |
| 6,867,256 B1 | 3/2005 | Di Silvestro et al. | |
| 6,872,311 B2 | 3/2005 | Koslow | |
| 6,872,431 B2 | 3/2005 | Kahlbaugh et al. | |
| 6,932,907 B2 | 8/2005 | Haq et al. | |
| 6,953,544 B2 | 10/2005 | Jones et al. | |
| 6,966,939 B2 | 11/2005 | Rammig et al. | |
| 6,986,804 B2 * | 1/2006 | Dominiak | B01D 46/0036 55/385.3 |
| 6,998,164 B2 | 2/2006 | Neely et al. | |
| 7,008,465 B2 | 3/2006 | Graham et al. | |
| 7,045,029 B2 | 5/2006 | DeLucia et al. | |
| 7,137,510 B1 | 11/2006 | Klein et al. | |
| 7,314,497 B2 * | 1/2008 | Kahlbaugh | B01D 39/2024 210/508 |
| 7,326,272 B2 | 2/2008 | Hornfeck et al. | |
| 7,883,562 B2 | 2/2011 | Healey et al. | |
| 7,959,751 B2 | 6/2011 | Hanson et al. | |
| 8,057,566 B1 * | 11/2011 | Sanders | B01D 39/06 428/222 |
| 8,197,569 B2 | 6/2012 | Healey et al. | |
| 8,202,340 B2 | 6/2012 | Healey et al. | |
| 8,257,459 B2 | 9/2012 | Healey et al. | |
| 8,262,780 B2 | 9/2012 | Smithies et al. | |
| 8,394,183 B2 | 3/2013 | Ishida et al. | |
| 8,882,875 B2 | 11/2014 | Healey et al. | |
| 2003/0022584 A1 | 1/2003 | Latimer et al. | |
| 2003/0150199 A1 | 8/2003 | Tanaka et al. | |
| 2003/0203695 A1 | 10/2003 | Polanco et al. | |
| 2003/0203696 A1 | 10/2003 | Healey | |
| 2003/0213109 A1 * | 11/2003 | Neely | A61F 13/537 28/116 |
| 2004/0060269 A1 | 4/2004 | Chung et al. | |
| 2005/0011173 A1 | 1/2005 | Hornfeck et al. | |
| 2005/0193696 A1 | 9/2005 | Muller et al. | |
| 2006/0042049 A1 | 3/2006 | Petersen | |
| 2006/0091066 A1 | 5/2006 | Driml et al. | |
| 2006/0217019 A1 * | 9/2006 | Wilkins | B01D 39/2017 442/180 |
| 2006/0272303 A1 | 12/2006 | Fujiwara et al. | |
| 2007/0084786 A1 | 4/2007 | Smithies | |
| 2007/0220852 A1 | 9/2007 | Lifshutz et al. | |
| 2008/0023121 A1 | 1/2008 | Hanson et al. | |
| 2008/0067121 A1 | 3/2008 | Ter Horst et al. | |
| 2008/0110342 A1 | 5/2008 | Ensor et al. | |
| 2008/0202078 A1 * | 8/2008 | Healey | B01D 39/1623 55/341.1 |
| 2008/0217241 A1 | 9/2008 | Smithies et al. | |
| 2008/0302242 A1 | 12/2008 | Schelling et al. | |
| 2009/0272084 A1 | 11/2009 | Healey et al. | |
| 2010/0107881 A1 | 5/2010 | Healey et al. | |
| 2011/0162337 A1 | 7/2011 | Healey et al. | |
| 2012/0087621 A1 * | 4/2012 | Kopp | G02B 6/12007 385/14 |
| 2012/0304602 A1 | 12/2012 | Healey et al. | |
| 2013/0025245 A1 | 1/2013 | Healey | |
| 2013/0025809 A1 | 1/2013 | Godsay et al. | |
| 2014/0157742 A1 | 6/2014 | Healey et al. | |
| 2014/0265009 A1 | 9/2014 | Schaffitzel | |
| 2015/0121823 A1 | 5/2015 | Healey | |

FOREIGN PATENT DOCUMENTS

| | | |
|---|---|---|
| EP | 1 163 038 B1 | 12/2006 |
| GB | 2 145 126 A | 3/1985 |
| GB | 2 389 326 A | 12/2003 |
| JP | 58-088019 A | 5/1983 |
| JP | 62-024922 U | 2/1987 |
| JP | 62-087723 U | 6/1987 |
| JP | 04-045813 A | 2/1992 |
| JP | 04-180808 A | 6/1992 |
| JP | 08-024546 A | 1/1996 |
| JP | 3074719 U | 1/2001 |
| JP | 2001-179028 A | 7/2001 |
| JP | 2003-181228 A | 7/2003 |
| WO | 94/11089 A1 | 5/1994 |
| WO | WO 00/56421 A1 | 9/2000 |

(56) References Cited

FOREIGN PATENT DOCUMENTS

| WO | 01/08781 A2 | 2/2001 |
|---|---|---|
| WO | 2007/147062 A2 | 12/2007 |
| WO | 2007/147065 A2 | 12/2007 |
| WO | 2008/150548 A2 | 12/2008 |
| WO | WO 2009/057557 A1 | 5/2009 |
| WO | WO 2013/001164 A1 | 1/2013 |
| WO | WO 2014/073802 A1 | 5/2014 |

OTHER PUBLICATIONS

U.S. Appl. No. 13/565,524, filed Aug. 2, 2012, Healey.
EP 08730820.1, Jul. 20, 2010, European Search Report.
EP 13165352, Jun. 7, 2013, Partial European Search Report.
PCT/US2008/055088, Jul. 29, 2008, International Search Report and Written Opinion.
PCT/US2008/055088, Jun. 16, 2009, International Preliminary Report on Patentability.
EP 10749052.6, Jun. 18, 2012, Extended European Search Report.
PCT/US2010/00656, May 7, 2010, International Search Report and Written Opinion.
PCT/US2010/00656, Sep. 15, 2011, International Preliminary Report on Patentability.
PCT/US2010/002081, Apr. 12, 2011, International Search Report and Written Opinion.
PCT/US2010/002081, Feb. 2, 2012, International Preliminary Report on Patentability.
European Search Report for EP 08730820.1 dated Jul. 20, 2010.
Partial European Search Report for EP 13165352 dated Jun. 7, 2013.
International Search Report and Written Opinion for International Application No. PCT/US2008/055088 dated Jul. 29, 2008.
International Preliminary Report on Patentability for International Application No. PCT/US2008/055088 dated Jun. 16, 2009.
Extended European Search Report for EP 10749052.6 dated Jun. 18, 2012.
International Search Report and Written Opinion for International Application No. PCT/US2010/00656 dated May 7, 2010.
International Preliminary Report on Patentability for International Application No. For PCT/US2010/000656 dated Sep. 15, 2011.
International Search Report and Written Opinion for International Application No. PCT/US2010/002081, dated Apr. 12, 2011.
International Preliminary Report on Patentability for International Application No. PCT/US2010/002081 dated Feb. 2, 2012.
International Search Report and Written Opinion for PCT/US2015/037382 dated Sep. 15, 2015.

* cited by examiner

FILTER MEDIA INCLUDING ORIENTED FIBERS

FIELD OF THE INVENTION

The embodiments herein relate to filtration, and more particularly to filter media having particular fiber orientations within the media.

BACKGROUND

The removal of air borne particulate contaminants from the air is a concern to everyone. Gas phase particulate filtration has traditionally been accomplished by methods that utilize woven or nonwoven fabrics or webs. The performance of such a system is characterized by the initial efficiency of removal or capture of the particulate as a function of particle size, the initial resistance of the system to air or gas flow as a function of gas flow rate or face velocity, the average efficiency of removal or capture of the particulate as a function of particle size, and/or the way these factors change as the filter element loads with the particulate contaminant. Although different types of filter media are available, improvements are needed.

SUMMARY

Filter media having particular fiber orientations within the media are provided.

In one embodiment, a filter media is provided. The filter media comprises a filtration layer comprising a plurality of fibers including fiber portions, the plurality of fibers having an average fiber diameter of at least 10 microns and less than or equal to 60 microns, the filtration layer having a first surface, wherein at least 25% of the fiber portions of the filtration layer are positioned at an angle of between 46 degrees and 90 degrees with respect to the first surface. The filtration layer has a basis weight of at least 40 gsm, and a cover layer adjacent the filtration layer, wherein a fine fiber layer having an average fiber diameter of less than 10 microns is absent from the filter media. The filter media has a thickness of at least 0.035 inches.

In another embodiment, a filter media comprises a filtration layer comprising a plurality of fibers including fiber portions, the plurality of fibers having an average fiber diameter of at least 10 microns and less than or equal to 60 microns, the filtration layer having a first surface, wherein at least 25% of the fiber portions of the filtration layer are positioned at an angle of between 46 degrees and 90 degrees with respect to the first surface. The filtration layer comprises at least 10 wt % of binder fibers, wherein the filtration layer has a basis weight of at least 40 gsm. A fine fiber layer having an average fiber diameter of less than 10 microns is absent from the filter media. The filter media has an thickness of at least 0.035 inches.

In another embodiment, a filter media comprises a filtration layer comprising a plurality of fibers including fiber portions, the plurality of fibers having an average fiber diameter of at least 5 microns and less than or equal to 60 microns, the filtration layer having a first surface, wherein at least 25% of the fiber portions of the filtration layer are positioned at an angle of between 46 degrees and 90 degrees with respect to the first surface. The filtration layer has a basis weight of at least 40 gsm, the filter media has an thickness of at least 0.035 inches, and the filter media has an overall air permeability of between 310 CFM and 800 CFM.

In another embodiment, a filter media comprises a first filtration layer comprising a plurality of fibers including fiber portions, the plurality of fibers having an average fiber diameter of at least 5 microns and less than or equal to 60 microns, the first filtration layer having a first surface. The filter media also includes a second filtration layer comprising a plurality of fiber portions having an average fiber diameter of at least 5 microns and less than or equal to 40 microns, wherein the first and second filtration layers are directly adjacent one another. Each of the first and second filtration layers comprises fiber portions that are positioned at an angle of between 46 degrees and 90 degrees with respect to the first surface. At least 25% of the combined fiber portions of the first and second filtration layers are positioned at an angle of between 46 degrees and 90 degrees with respect to the first surface. The first and second filtration layers have a combined basis weight of at least 40 gsm. The filter media has an thickness of at least 0.035 inches. The filter media has an average filtration efficiency of at least 40% for 0.4 micron or greater particles.

In another embodiment, a filter media comprises a filtration layer comprising a plurality of fibers including fiber portions, the plurality of fibers having an average fiber diameter of at least 10 microns and less than or equal to 60 microns, the filtration layer having a first surface. At least 10% of the fiber portions of the filtration layer are positioned at an angle of between 0 degrees and 30 degrees with respect to the first surface, at least 25% of the fiber portions of the filtration layer are positioned at an angle of between 31 degrees and 60 degrees with respect to the first surface, and at least 40% of the fiber portions of the filtration layer are positioned at an angle of between 61 degrees and 90 degrees with respect to the first surface. The filtration layer has a basis weight of at least 40 gsm. The filter media also includes a cover layer adjacent the filtration layer. A fine fiber layer having an average fiber diameter of less than 10 microns is absent from the filter media. The filter media has an thickness of at least 0.035 inches.

Filter elements including the filter media described above and herein are also provided. Methods of filtering fluids including such filter media and filter elements are also provided.

DETAILED DESCRIPTION

Filter media incorporating one or more filtration layers that include fiber portions orientated at a non-zero angle with respect to a surface of the filtration layer are provided. In some embodiments, at least some of the fiber portions are positioned at an angle of at least 20 degrees (e.g., between 46 degrees and 90 degrees, or between 61 degrees and 90 degrees) with respect to a surface (e.g., a planar surface) of the filtration layer. In some embodiments, the angle may be measured with respect to the horizontal or an outer or cover layer of the media. This orientation of fiber portions results in an increased efficiency (e.g., average efficiency and/or initial efficiency) compared to filter media that do not include such oriented fiber portions, thereby enhancing various properties of the filter media. The fibers of the filtration layer may be relatively coarse; for instance, they may have an average fiber diameter of at least 5 microns or at least 10 microns. The filtration layer may optionally include binder fibers that can help to maintain the configuration of fibers in their orientations. The filter media may also optionally include a support layer (e.g., a scrim) that is planar with respect to the surface of the filtration layer. In certain embodiments described herein, the filter media do not include a fine fiber layer which would improve filtration efficiency, but also increase cost of the media. Advantageously, the filter media described herein can be used to form a variety of filter elements for use in various applications. Moreover, the filter media may be cost effective and easy to manufacture.

Figure 1A:
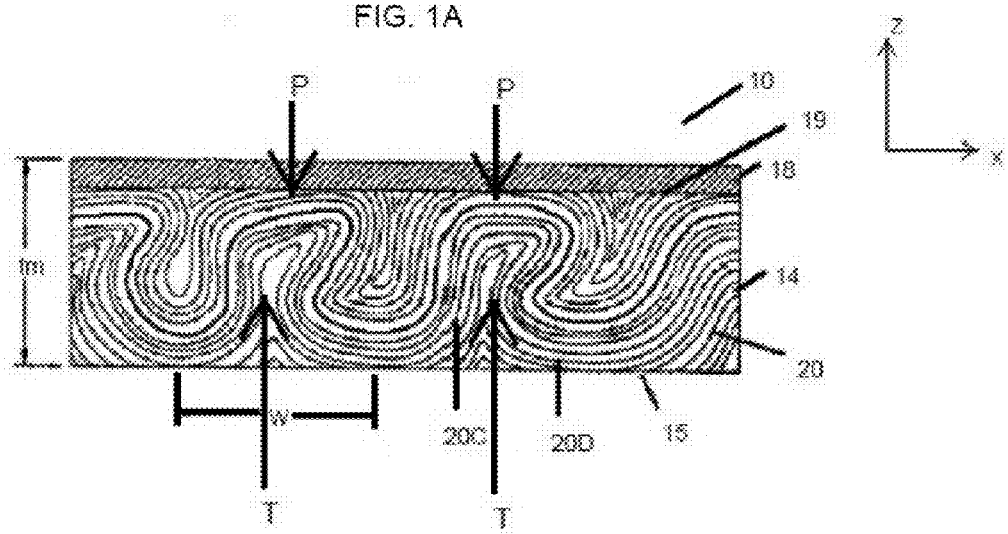
FIG. 1A is a side view illustration of one embodiment of a filter media.

FIG. 1A illustrates one exemplary embodiment of a filter media 10 having a filtration layer that includes fiber portions orientated at a non-zero angle with respect to a surface of the filtration layer. The fibers or fiber portions may have a waved configuration as described in more detail below. In the illustrated embodiment, the filter media includes a filtration layer 14 having a surface 15 (e.g., a first planar surface) and a second surface 19 (e.g., a second planar surface) along the horizontal in the X-direction. The filter media can also optionally include one or more outer or cover layers 18 located on the upstream-most and/or downstream-most sides of the filter media.

Figure 1B:
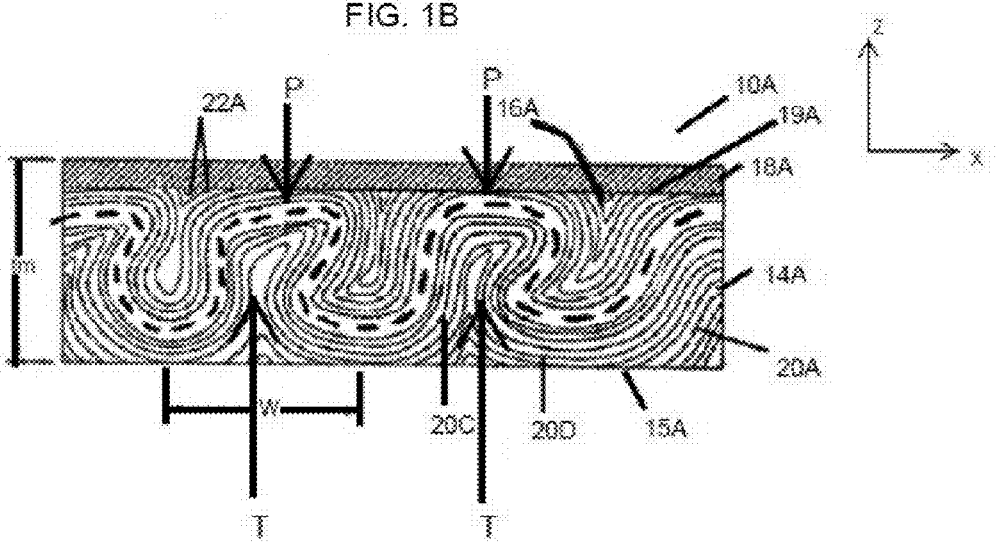
FIG. 1B is a side view illustration of another embodiment of a filter media.
Figure 1C:
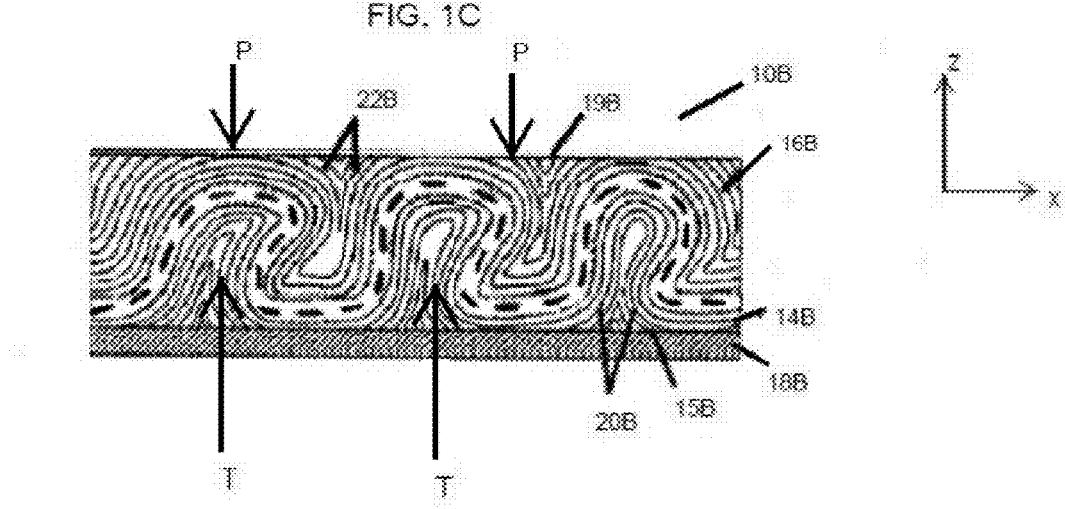
FIG. 1C is a side view illustration of yet another embodiment of a filter media.

FIG. 1B illustrates one exemplary embodiment of a filter media 10A having at least two filtration layers that include fiber portions orientated at a non-zero angle with respect to a surface of the filtration layer. The fibers or fiber portions may have a waved configuration. In the illustrated embodiment, the filter media includes a first, downstream filtration layer 14A having a surface 15A (e.g., a first planar surface) along the horizontal in the X-direction. The filter media also includes a second, upstream filtration layer 16A positioned adjacent the first filtration layer, the second filtration layer having a surface 19A (e.g., a second planar surface) along the horizontal in the X-direction. The filter media can also optionally include one or more outer or cover layers located on the upstream-most and/or downstream-most sides of the filter media. FIG. 1B illustrates an outer or cover layer 18A disposed on the upstream side of the filter media, while FIG. 1C illustrates an outer or cover layer 18B disposed on the downstream side of the filter media.

As shown illustratively in FIG. 1B, the first filtration layer includes a first plurality of fibers 20A, and the second filtration layer includes a second plurality of fibers 22A. The fibers of the filtration layer(s) may be relatively coarse (e.g., having an average fiber diameter of at least 5 microns or at least 10 microns). The coarseness of the fibers may give the fibers sufficient strength to help maintain them in their angled orientations.

In some embodiments, each of the first and second plurality of fibers includes a relatively high percentage of fiber portions oriented at an angle with respect to the horizontal (e.g., X-direction in FIGS. 1A-1C), or with respect to a surface of the filtration layer (e.g., surface 15 or 19) or a surface of an outer or cover layer. As described in more detail below, a relatively high percentage of the fiber portions in the first and/or second filtration layers may be positioned at an angle of at least 20 degrees (e.g., between 61 degrees and 90 degrees, or between 46 degrees and 90 degrees) with respect to a surface of the filtration layer (e.g., surface 15 or 19), or with respect to a surface of an outer or cover layer of the media. For instance, as shown illustratively in FIG. 1B, a fiber portion 20C is positioned approximately 90 degrees with respect to a surface of the filtration layer (e.g., surface 15 or 19), or with respect to a surface of an outer or cover layer of the media. A fiber portion 20D is positioned approximately 0 degrees with respect to a surface of the filtration layer (e.g., surface 15 or 19), or with respect to a surface of an outer or cover layer of the media, because it lies on substantially the same plane as the surface of the filtration layer and an outer or cover layer of the media. The more fiber portions in the layer that are oriented towards the Z-direction, e.g., positioned perpendicular with respect to a surface of the filtration layer or with respect to a surface of an outer or cover layer of the media, the higher percentage of the fiber portions in the layer that are positioned at an angle of between 46 degrees and 90 degrees, or between 60 degrees and 90 degrees. This orientation of fiber portions results in an increased efficiency compared to filter media that do not include such oriented fiber portions, thereby enhancing various properties of the filter media. For instance, as described in more detail below in the Examples section, it has been realized that as a media includes a higher percentage of fiber portions oriented towards the Z-direction, the media has a higher initial efficiency as a function of particle size.

The layer(s) may be arranged so that surface 19 of the filter media is an upstream side (e.g., air entering side) in a filter element, and surface 15 is a downstream side (e.g., outflow side). Alternatively, surface 19 may be a downstream side and surface 15 may be an upstream side in a filter element.

The outer or cover layer can alternatively or additionally be a bottom layer disposed on the downstream side of the filter media, as shown illustratively in FIG. 1C. FIG. 1C illustrates another embodiment of a filter media 10C that is similar to filter media 10 of FIG. 1B. In this embodiment, filter media 10C does not include a top outer or cover layer, but rather has a first filtration layer 14B, a second filtration layer 16B disposed adjacent to and just upstream of the first filtration layer. It should be noted that although the outer or cover layers shown in the figures are illustrated with cross-hatched lines, these lines do not denote an orientation of fibers within the layer(s).

In some embodiments, the outer or cover layer may function to help support one or more filtration layers. For instance, the outer cover layer may function as a strengthening component and/or elongation component that provides structural integrity to the filter media to help maintain the fibers of the filtration layer(s) in the desired orientation. In other embodiments, the outer or cover layer may function as an aesthetic layer. The outer or cover layer(s) can also function to offer abrasion resistance.

As shown illustratively in FIGS. 1B-1C, the filtration layers may have waved configuration including a plurality of peaks P and troughs T with respect to each surface thereof. A person skilled in the art may appreciate that a peak P on one side of the filtration layer may have a corresponding trough T on the opposite side. Thus, downstream filtration layer 14A,B may extend into a trough T, and exactly opposite that same trough T is a peak P, across which upstream filtration layer 16A,B may extend. Peaks and troughs may also be present in a single filtration layer as shown illustratively in FIG. 1A. As shown illustratively in FIGS. 1A-1C, the troughs may be partially or substantially filled with fibers.

In certain exemplary embodiments, a filtration layer (e.g., a downstream and/or upstream filtration layer) can have a fiber density and/or fiber mass at the peaks that differs from a fiber density and/or fiber mass in the troughs. For instance, in some embodiments one or more filtration layers may have a fiber density and/or a fiber mass that is greater at the peaks than a fiber density and/or a fiber mass in the troughs. In other embodiments, one or more filtration layers may have a fiber density and/or a fiber mass that is less at the peaks than a fiber density and/or a fiber mass in the troughs. Other configurations are also possible.

It should be appreciated that a variety of other configurations are possible other than those shown in FIGS. 1A-1C, and that the filter media can include any number of layers in various arrangements. For example, in some embodiments, a filter media includes both an upstream outer or cover layer, and downstream outer or cover layer. In other embodiments, neither an upstream nor a downstream outer or cover layer is present in the filter media. Additionally, while two filtration layers 14A,B, 16A,B are shown in FIGS. 1B-1C, the filter media need not include both filtration layers. For instance, in some embodiments, only a single filtration layer is present in a filter media like that shown in FIG. 1A. In other embodiments more than one filtration layers (e.g., at least 2, at least 3, at least 4, at least 5, at least 6, at least 7, at least 8, at least 9, or at least 10 filtration layers) may be present in a filter media. One, more, or each of the filtration layers may include a relatively high percentage of oriented fiber portions as described herein. Additionally, it should be appreciated that the terms "first", "second", "third" and "fourth" layers, as used herein, refer to different layers within the media, and are not meant to be limiting with respect to the particular function of that layer.

As shown illustratively in FIGS. 1B and 1C, the filter media includes two filtration layers that are directly adjacent to one another and not separated by a fine fiber layer (e.g., a fine fiber layer having an average fiber diameter of less than 10 microns, less than 5 microns, less than 3 microns, less than 1.5 microns, or less than 1 micron). FIG. 1A also does not include such a fine fiber layer. While including a fine fiber layer in the filter media would likely have increased efficiency of the media, it would likely have also increased cost of the media and potentially be more difficult to manufacture. The absence of a fine fiber layer from the filter media can allow the media to be cost effective and easy to manufacture, while the oriented fiber portions of the filtration layer(s) provide sufficient efficiency for various applications. In several embodiments described herein, a fine fiber layer formed from meltblown fibers, electrospun fibers or glass fibers is absent from the media. In several embodiments described herein, a fine fiber layer formed from a wetlaid process, an airlaid process, a drylaid process, a carding process, an electrospinning process, or a spunbonding process is absent from the media. In some embodiments, a porous membrane is absent from the filter media. Additionally, in several embodiments described herein, a fine fiber layer having (as measured in a planar configuration) a thickness in the range of about 0.5 mils to 30 mils (e.g., 2 mils to 30 mils) and/or an air permeability in the range of about 5 CFM to 300 CFM (e.g., 10 CFM to 300 CFM), and/or a basis weight in the range of about 1.8 gsm to 50 gsm (e.g., 3 gsm to 50 gsm), and/or a DOP filtration efficiency in the range of about 20% to 99%, is absent from the media.

As used herein, when a layer is referred to as being "adjacent" another layer, it can be directly adjacent the layer, or one or more intervening layers also may be present. A layer that is "directly adjacent" another layer means that no intervening layer is present.

As indicated above, the filter media 10, 10A and 10B can include at least one filtration layer. The fiber portions in the filtration layer may be oriented at an angle with respect to the horizontal, or with respect to a surface (e.g., a planar surface) of the filtration layer or an outer or cover layer. In some embodiments, a certain percentage of the fiber portions of the layer may be within certain ranges of angles, e.g., between about 46 degrees and about 90 degrees, between about 0 degrees and about 45 degrees, between about 61 degrees and about 90 degrees, between about 31 degrees and about 60 degrees, or between about 0 degrees and about 30 degrees. Orientation of the fiber portions of a layer can be determined by obtaining a scanning electron micrograph (SEM) of a cross-section of the layer. Scanning electron microscopy will be known to one skilled in the art and generally refers to the use of a focused electron beam to produce an image (e.g., a greyscale image) of the surface topography of a sample. The images can be analyzed using several image analysis and manipulation software packages (e.g., Mathematica by Wolfram Research). The images described herein were collected on an Aspex 3025 SEM at a working distance of 13.6 mm-22.9 mm, with a magnification ranging between 20×-30×, and a resolution of 1024 pixels×1024 pixels. Filter media samples were 1.75" in diameter and were vacuum sputter coated with gold prior to image acquisition. Orientation of the fiber portions, as described herein, is determined by fitting straight line segments (e.g., ranging from 2 to 25 pixels in length) to each portion of the fibers in the image. The orientation of each line segment is calculated and normalized by its length to obtain the overall orientation distribution. The percentage of fiber portions oriented between a range of two angles is calculated by counting the number of normalized line segments having an orientation between the range of the two angles of interest, and dividing by the total number of normalized line segments. Accordingly, the percentage of fiber portions oriented between a range of two angles is a representation of the orientation of all the fibers portions in the cross-section of the layer oriented between that range. Images can also be acquired by optical microscopy.

In some embodiments, a relatively high percentage of the fiber portions in the filtration layer are positioned at a non-zero angle with respect to the horizontal, or with respect to a surface (e.g., a planar surface) of the filtration layer or an outer or cover layer. For instance, the percentage of fiber portions in the filtration layer that are positioned at an angle between about 46 degrees and about 90 degrees with respect to the horizontal, or with respect to a surface (e.g., a planar surface) of the filtration layer or an outer or cover layer, may be greater than or equal to about 10%, greater than or equal to about 15%, greater than or equal to about 20%, greater than or equal to about 30%, or greater than or equal to about 40%, greater than or equal to about 50%, or greater than or equal to about 60%, or greater than or equal to about 70%. In certain embodiments, the percentage of fiber portions in the filtration layer that are positioned at an angle of between about 46 degrees and about 90 degrees with respect to the horizontal, or with respect to a surface (e.g., a planar surface) of the filtration layer or an outer or cover layer, may be less than or equal to about 80%, less than or equal to about 70%, less than or equal to about 60%, less than or equal to about 50%, less than or equal to about 40%, less than or equal to about 30%, or less than or equal to about 20%. Combinations of the above-referenced ranges are also possible (e.g., greater than or equal to about 40% and less than or equal to about 80%). Other ranges are also possible. In some embodiments, a combination of filtration layers may have a percentage of fiber portions in one or more of the above-referenced ranges.

In some embodiments, the percentage of fiber portions in the filtration layer that are positioned at an angle of between about 0 degrees and about 45 degrees with respect to the horizontal, or with respect to a surface (e.g., a planar surface) of the filtration layer or an outer or cover layer may be relatively low. For instance, the percentage of fiber portions in the filtration layer that are positioned at an angle between about 0 degrees and about 45 degrees with respect to the horizontal, or with respect to a surface (e.g., a planar surface) of the filtration layer or an outer or cover layer, may be greater than or equal to about 10%, greater than or equal to about 15%, greater than or equal to about 20%, greater than or equal to about 30%, or greater than or equal to about 40%. In certain embodiments, the percentage of fiber portions in the filtration layer that are positioned at an angle of between about 0 degrees and about 45 degrees with respect to the horizontal, or with respect to a surface (e.g., a planar surface) of the filtration layer or an outer or cover layer, may be less than or equal to about 50%, less than or equal to about 40%, less than or equal to about 30%, less than or equal to about 20%, less than or equal to about 15%, or less than or equal to about 10%. Combinations of the above-referenced ranges are also possible (e.g., greater than or equal to about 10% and less than or equal to about 40%). Other ranges are also possible. In some embodiments, a combination of filtration layers may have a percentage of fiber portions in one or more of the above-referenced ranges.

In certain embodiments, the percentage of fiber portions in the filtration layer that are positioned at an angle between about 0 degrees and about 30 degrees with respect to the horizontal, or with respect to a surface (e.g., a planar surface) of the filtration layer or an outer or cover layer, may be greater than or equal to about 10%, greater than or equal to about 15%, greater than or equal to about 20%, or greater than or equal to about 30%. In some embodiments, the percentage of fiber portions in the filtration layer that are positioned at an angle of between about 0 degrees and about 30 degrees with respect to the horizontal, or with respect to a surface (e.g., a planar surface) of the filtration layer or an outer or cover layer may be less than or equal to about 40%, less than or equal to about 30%, less than or equal to about 20%, or less than or equal to about 10%. Combinations of the above-referenced ranges are also possible (e.g., greater than or equal to about 10% and less than or equal to about 30%). Other ranges are also possible In some embodiments, a combination of filtration layers may have a percentage of fiber portions in one or more of the above-referenced ranges.

In certain embodiments, the percentage of fiber portions in the filtration layer that are positioned at an angle between about 31 degrees and about 60 degrees with respect to the horizontal, or with respect to a surface (e.g., a planar surface) of the filtration layer or an outer or cover layer, may be greater than or equal to about 10%, greater than or equal to about 20%, greater than or equal to about 25%, greater than or equal to about 30%, greater than or equal to about 35%, greater than or equal to about 40%, or greater than or equal to about 50%. In some embodiments, the percentage of fiber portions in the filtration layer that are positioned at an angle of between about 31 degrees and about 60 degrees with respect to the horizontal, or with respect to a surface (e.g., a planar surface) of the filtration layer or an outer or cover layer may be less than or equal to about 60%, less than or equal to about 50%, less than or equal to about 40%, less than or equal to about 35%, less than or equal to about 30%, less than or equal to about 25%, or less than or equal to about 20%. Combinations of the above-referenced ranges are also possible (e.g., greater than or equal to about 20% and less than or equal to about 50%). Other ranges are also possible In some embodiments, a combination of filtration layers may have a percentage of fiber portions in one or more of the above-referenced ranges.

In certain embodiments, the percentage of fiber portions in the filtration layer that are positioned at an angle between about 61 degrees and about 90 degrees with respect to the horizontal, or with respect to a surface (e.g., a planar surface) of the filtration layer or an outer or cover layer, may be greater than or equal to about 30%, greater than or equal to about 40%, greater than or equal to about 50%, greater than or equal to about 60%, or greater than or equal to about 70%. In some embodiments, the percentage of fiber portions in the filtration layer that are positioned at an angle of between about 61 degrees and about 90 degrees with respect to the horizontal, or with respect to a surface (e.g., a planar surface) of the filtration layer or an outer or cover layer may be less than or equal to about 80%, less than or equal to about 70%, less than or equal to about 60%, less than or equal to about 50%, less than or equal to about 40%, or less than or equal to about 30%. Combinations of the above-referenced ranges are also possible (e.g., greater than or equal to about 30% and less than or equal to about 70%). Other ranges are also possible. In some embodiments, a combination of filtration layers may have a percentage of fiber portions in one or more of the above-referenced ranges.

A filtration layer described herein can be formed from a variety of fibers types and sizes. Additionally, in embodiments in which more than one filtration layers are present, each of the filtration layers may be formed of different fiber types and/or sizes. For instance, in an exemplary embodiment, the downstream filtration layer 14A of FIG. 1B is formed from fibers having an average fiber diameter that is greater than an average fiber diameter of upstream filtration layer. Each of the filtration layers may independently be formed of fibers having average diameters and/or average lengths in the ranges described below. Additionally, each of the filtration layers of a filter media may independently have other physical and/or performance characteristics in the ranges described below.

The fibers of the filtration layer may be relatively course. For instance, in some embodiments, the fibers of the filtration layer may have an average fiber diameter of between about 5 microns and about 65 microns (e.g., between about 9 microns and about 50 microns). In some embodiments, the fibers may have an average fiber diameter of greater than or equal to about 5 microns, greater than or equal to about 9 microns, greater than or equal to about 10 microns, greater than or equal to about 12 microns, greater than or equal to about 15 microns, greater than or equal to about 20 microns, greater than or equal to about 30 microns, greater than or equal to about 40 microns, greater than or equal to about 50 microns, greater than or equal to about 60 microns, or greater than or equal to about 65 microns. In some embodiments, the fibers of the filtration layer may have an average fiber diameter of less than or equal to about 65 microns, less than or equal to about 60 microns, less than or equal to about 50 microns, less than or equal to about 40 microns, less than or equal to about 30 microns, less than or equal to about 20 microns, less than or equal to about 10 microns, less than or equal to about 9 microns, or less than or equal to about 5 microns. Combinations of the above references ranges are also possible (e.g., an average fiber diameter of greater than or equal to about 9 microns and less than about 50 microns). Other ranges are also possible. In some embodiments, a combination of filtration layers may have an average fiber diameter in one or more of the above-referenced ranges.

The fibers of the filtration layer may have an average fiber length of, for example, between about 0.5 inches and about 3.5 inches (e.g., between about 1.5 inches and about 2 inches). In some embodiments, the fibers of the filtration layer may have an average fiber length of less than or equal to about 3.5 inches, less than or equal to about 3 inches, less than or equal to about 2.5 inches, less than or equal to about 2 inches, less than or equal to about 1 inch, or less than or equal to about 0.5 inches, or less than or equal to about 0.3 inches. In some embodiments, the fibers of the filtration layer may have an average fiber length of greater than or equal to about 0.2 inches, greater than or equal to about 0.5 inches, greater than or equal to about 1 inch, greater than or equal to about 1.5 inches, greater than or equal to about 2.0 inches, greater than or equal to about 2.5 inches, greater than or equal to about 3.0 inches, or greater than or equal to about 3.5 inches. Combinations of the above references ranges are also possible (e.g., fibers having an average fiber length of greater than or equal to about 1.5 inches and less than about 2 inches). Other ranges are also possible. In some embodiments, a combination of filtration layers may have an average fiber length in one or more of the above-referenced ranges. In some embodiments, the fibers of the filtration layer are staple fibers.

Additionally, in embodiments in which more than one filtration layers are present in a media, each filtration layer may have an average fiber diameter and/or length having one or more of the above-referenced ranges.

Various materials can also be used to form the fibers of the filtration layers, including synthetic and non-synthetic materials. Synthetic fibers may include any suitable type of synthetic polymer. Examples of suitable synthetic fibers include polyesters (e.g., polyethylene terephthalate, polybutylene terephthalate), polyamide, polyaramid, para-aramid, meta-aramid, polyaniline, polyimide, polyethylene, polypropylene, polyether ether ketone, polyolefin, nylon, acrylics, polyvinyl alcohol, regenerated cellulose (e.g., lyocell, rayon), cellulose acetate, polyvinylidene fluoride, poly(vinylidene fluoride-co-hexafluoropropylene), polyacrylonitriles, polysulfones (e.g., polyether sulfones, poly(phenylene ether sulfone)), polystyrene, polybutadiene, polyurethane, polyphenylene oxide, polycarbonate, poly(methyl methacrylate), polyhydroxyethylmethacrylate, poly(lactic acid) or polylactide, silk, poly (4-methyl-1-pentene), polypyrrole, and combinations thereof. In some embodiments, one or more fibers can include copolymers of the above (e.g., block copolymers of polystyrene-polybutadiene). In some embodiments, the synthetic fibers are organic polymer fibers.

A filtration layer may include a suitable percentage of synthetic fibers. For example, in some embodiments, the weight percentage of synthetic fibers in the filtration layer may be between about 50 wt % and about 100 wt % of all fibers in the filtration layer. In some embodiments, the weight percentage of synthetic fibers in the filtration layer may be greater than or equal to about 50 wt %, greater than or equal to about 60 wt %, greater than or equal to about 70 wt %, greater than or equal to about 80 wt %, greater than or equal to about 90 wt %, or greater than or equal to about 95 wt %. In some embodiments, the weight percentage of the synthetic fibers in the filtration layer may be less than or equal to about 100 wt %, less than or equal to about 95 wt %, less than or equal to about 90 wt %, less than or equal to about 80 wt %, less than or equal to about 70 wt %, or less than or equal to about 50 wt %. Combinations of the above-referenced ranges are also possible (e.g., a weight percentage of greater than or equal to about 90 wt % and less than or equal to about 100 wt %). Other ranges are also possible. In some embodiments, a filtration layer includes 100 wt % of synthetic fibers. In some embodiments, a filtration layer includes the above-noted ranges of synthetic fibers with respect to the total weight of the filtration layer (e.g., including any resins). In some embodiments, a combination of filtration layers may have a percentage of synthetic fibers in one or more of the above-referenced ranges. Additionally, in embodiments in which more than one filtration layers are present in a media, each filtration layer may have a percentage of synthetic fibers having one or more of the above-referenced ranges. In other embodiment, the above-referenced ranges of fibers may apply to the entire filter media (which may include multiple filtration layers). The remaining fibers of the filtration layer and/or filter media may be non-synthetic fibers, such as glass fibers, glass wool fibers, and/or cellulose pulp fibers (e.g., wood pulp fibers).

In some embodiments, a filtration layer includes binder fibers. The amount of binder fibers in a filtration layer may vary. For example, the weight percentage of binder fibers in the filtration layer may be between about 10 wt % and about 100 wt % (e.g., between about 20 wt % and about 70 wt %) of all fibers in the filtration layer. In some embodiments, the weight percentage of binder fibers in the filtration layer may be greater than or equal to about 10 wt %, greater than or equal to about 20 wt %, greater than or equal to about 30 wt %, greater than or equal to about 40 wt %, greater than or equal to about 50 wt %, greater than or equal to about 60 wt %, greater than or equal to about 70 wt %, greater than or equal to about 80 wt %, or greater than or equal to about 90 wt %. In some cases, the weight percentage of binder fibers in the filtration layer may be less than or equal to about 100 wt %, less than or equal to about 90 wt %, less than or equal to about 80 wt %, less than or equal to about 70 wt %, less than or equal to about 60 wt %, less than or equal to about 50 wt %, less than or equal to about 40 wt %, less than or equal to about 30 wt %, less than or equal to about 20 wt %, or less than or equal to about 10 wt %. Combinations of the above-referenced ranges are also possible (e.g., a weight percentage of binder fibers of greater than or equal to about 20 wt % and less than about 70 wt %). In some embodiments, a filtration layer includes the above-noted ranges of binder fibers with respect to the total weight of the filtration layer (e.g., including any resins). Other ranges of binder fibers are also possible. In some embodiments, a filtration layer can include 100% binder fibers. In some embodiments, a combination of filtration layers may have a percentage of binder fibers in one or more of the above-referenced ranges. Additionally, in embodiments in which more than one filtration layers are present in a media, each filtration layer may have a percentage of binder fibers having one or more of the above-referenced ranges. In other embodiment, the above-referenced ranges of fibers may apply to the entire filter media (which may include multiple filtration layers). The remaining fibers of the filtration layer and/or filter media may be non-binder fibers.

A variety of types of binder and non-binder fibers can be used to form the media described herein. The binder fibers can be formed from any material that is effective to facilitate thermal bonding between the fibers, and will thus have an activation temperature that is lower than the melting temperature of the non-binder fibers. The binder fibers can be monocomponent fibers or any one of a number of bicomponent binder fibers. In one embodiment, the binder fibers can be bicomponent fibers, and each component can have a different melting temperature. For example, the binder fibers can include a core and a sheath where the activation temperature of the sheath is lower than the melting temperature of the core. This allows the sheath to melt prior to the core, such that the sheath binds to other fibers in the layer, while the core maintains its structural integrity. This is particularly advantageous in that it creates a more cohesive layer for trapping filtrate. The core/sheath binder fibers can be concentric or non-concentric, and exemplary core/sheath binder fibers can include the following: a polyester core/copolyester sheath, a polyester core/polyethylene sheath, a polyester core/polypropylene sheath, a polypropylene core/polyethylene sheath, and combinations thereof. Other exemplary bicomponent binder fibers can include split fiber fibers, side-by-side fibers, and/or "island in the sea" fibers. Exemplary bi-component binder fibers can include Trevira Types 254, 255, and 256; Invista Cellbond® Type 255; Fiber Innovations Types 201, 202, 215, and 252; and ES Fibervisions AL-Adhesion-C ESC 806A.

The non-binder fibers can be synthetic and/or non-synthetic, and in an exemplary embodiment the non-binder fibers can be about 100 percent synthetic. In general, synthetic fibers are preferred over non-synthetic fibers for resistance to moisture, heat, long-term aging, and microbiological degradation. Exemplary synthetic non-binder fibers can include polyesters, acrylics, polyolefins, nylons, rayons, polyvinyl derivatives (e.g., polyvinylchloride, polyvinyl alcohol, polytetrafluoroethylene, polyvinylidene chloride), and combinations thereof. Additionally or alternatively, the non-binder fibers used to form the media can include non-synthetic fibers such as glass fibers, glass wool fibers, cellulose pulp fibers, such as wood pulp fibers, and combinations thereof. Exemplary synthetic non-binder fibers can include Trevira Type 290 and Wellman Fortrel® Types 204, 289 and 510.

The filtration layers can also be formed using various techniques known in the art, including wet laid techniques and non-wet laid techniques. Non-wet laid fibers include, for example, dry laid (carded) fibers, spunbond fibers, and/or air laid fibers. In an exemplary embodiment, the filtration layers are carded or airlaid webs.

The resulting filtration layers can also have a variety of basis weights, thicknesses, and air permeabilities depending upon the requirements of a desired application. In one exemplary embodiment, the filtration layer has a thickness in the range of about 40 mil to 1000 mil (e.g., about 80 mil to 230 mil), an air permeability in the range of about 150 CFM to 800 CFM (e.g., about 350 CFM to 600 CFM), and a basis weight in the range of about 40 gsm to 500 gsm (e.g., about 80 gsm to 200 gsm).

*Other Characteristics of the Filtration Layer

The basis weight of the filtration layer can typically be selected as desired. In some embodiments, the basis weight of the filtration layer may range from between about 40 and about 500 g/m$^2$. For instance, the basis weight of the filtration layer may be between about 80 and about 200 g/m$^2$. In some embodiments, the basis weight of the filtration layer may be greater than or equal to about 40 g/m$^2$ (e.g., greater than or equal to about 80 g/m$^2$, greater than or equal to about 100 g/m$^2$, greater than or equal to about 150 g/m$^2$, greater than or equal to about 200 g/m$^2$, greater than or equal to about 250 g/m$^2$, greater than or equal to about 300 g/m$^2$, greater than or equal to about 350 g/m$^2$, or greater than or equal to about 400 g/m$^2$). In some cases, the basis weight of the filtration layer may be less than or equal to about 500 g/m$^2$ (e.g., less than or equal to about 400 g/m$^2$, less than or equal to about 350 g/m$^2$, less than or equal to about 300 g/m$^2$, less than or equal to about 250 g/m$^2$, less than or equal to about 200 g/m$^2$, less than or equal to about 150 g/m$^2$, less than or equal to about 100 g/m$^2$, less than or equal to about 80 g/m$^2$, or less than or equal to about 40 g/m$^2$). Combinations of the above-referenced ranges are also possible (e.g., a basis weight of greater than or equal to about 80 g/m$^2$ and less than or equal to about 200 g/m$^2$). Other ranges are also possible. In some embodiments, a combination of filtration layers may have a combined basis weight in one or more of the above-referenced ranges. As determined herein, the basis weight of the filtration layer is measured according to the ASTM D-846 standard. Additionally, in embodiments in which more than one filtration layers are present in a media, each filtration layer may have a basis weight having one or more of the above-referenced ranges.

In some embodiments, the oriented fibers of the filtration layer results in the layer having a relatively high thickness. In some embodiments, the thickness of the filtration layer may range from between about 40 milliinches (mil) and about 1000 mil. For instance, the thickness of the filtration layer may range between about 80 mil and about 230 mil. In some embodiments, the thickness may be greater than or equal to about 40 mil (e.g., greater than or equal to about 80 mil, greater than or equal to about 100 mil, greater than or equal to about 200 mil, greater than or equal to about 300 mil, greater than or equal to about 400 mil, greater than or equal to about 500 mil, greater than or equal to about 750 mil, or greater than or equal to about 900 mil). In some cases, the thickness of the filtration layer may be less than or equal to about 1000 mil (e.g., less than or equal to about 750 mil, less than or equal to about 500 mil, less than or equal to about 400 mil, less than or equal to about 300 mil, less than or equal to about 230 mil, less than or equal to about 200 mil, less than or equal to about 100 mil, less than or equal to about 80 mil, or less than or equal to about 40 mil). Combinations of the above-references ranges are also possible (e.g., a thickness of greater than or equal to about 80 mil and less than or equal to about 230 mil). Other ranges are also possible. In some embodiments, a combination of filtration layers may have a combined thickness in one or more of the above-referenced ranges. Thickness, as referred to herein, is determined according to the Standard TAPPI T411. Additionally, in embodiments in which more than one filtration layers are present in a media, each filtration layer may have a thickness having one or more of the above-referenced ranges.

The filtration layer may exhibit a suitable mean flow pore size. Mean flow pore size, as determined herein, is measured according to Standard ASTM F316. In some embodiments, the mean flow pore size may range between about 0.1 microns and about 100 microns (e.g., between about 5 microns and about 40 microns, between about 15 microns and about 40 microns, or between about 25 microns and about 80 microns). In some embodiments, the mean flow pore size of the filtration layer may be less than or equal to about 100 microns, less than or equal to about 50 microns, less than or equal to about 40 microns, less than or equal to about 30 microns, less than or equal to about 20 microns, less than or equal to about 10 microns, or less than or equal to about 5 microns, or less than or equal to about 2 microns. In other embodiments, the mean flow pore size may be greater than or equal to about 1 micron, greater than or equal to about 5 microns, greater than or equal to about 10 microns, greater than or equal to about 20 microns, greater than or equal to about 25 microns, greater than or equal to about 30 microns, greater than or equal to about 50 microns or greater than or equal to about 100 microns. Combinations of the above-referenced ranges are also possible (e.g., a mean flow pore size of greater than or equal to about 10 microns and less than or equal to about 50 microns). Other values and ranges of mean flow pore size are also possible. In some embodiments, a combination of filtration layers may have a mean flow pore size in one or more of the above-referenced ranges. Additionally, in embodiments in which more than one filtration layers are present in a media, each filtration layer may have a mean flow pore size having one or more of the above-referenced ranges.

The filtration layer may exhibit suitable air permeability characteristics. In some embodiments, the air permeability of a filtration layer may range from between about 150 CFM and about 800 CFM (e.g., between about 350 CFM and about 600 CFM). In some embodiments, the air permeability may be greater than or equal to about 150 CFM, greater than or equal to about 200 CFM, greater than or equal to about 250 CFM, greater than or equal to about 300 CFM, greater than or equal to about 310 CFM, greater than or equal to about 350 CFM, greater than or equal to about 500 CFM, greater than or equal to about 600 CFM, or greater than or equal to about 700 CFM. In certain embodiments, the air permeability may be less than or equal to about 800 CFM, less than or equal to about 600 CFM, less than or equal to about 500 CFM, less than or equal to about 350 CFM, less than or equal to about 250 CFM, or less than or equal to about 150 CFM. Combinations of the above-referenced ranges are also possible (e.g., an air permeability of greater than or equal to 310 CFM and less than or equal to about 800 CFM). Other ranges are also possible. In some embodiments, a combination of filtration layers may have a combined air permeability in one or more of the above-referenced ranges. Additionally, in embodiments in which more than one filtration layers are present in a media, each filtration layer may have an air permeability having one or more of the above-referenced ranges.

As determined herein, the air permeability is measured according to the Standard TAPPI T-251. The permeability is an inverse function of flow resistance and can be measured with a Frazier Permeability Tester (e.g., TexTest Instrument, FX 3300). The Frazier Permeability Tester measures the volume of air per unit of time that passes through a unit area of sample at a fixed differential pressure across the sample. Permeability can be expressed in cubic feet per minute per square foot at a 0.5 inch water differential.

As previously indicated, the filter media can also optionally include one or more outer or cover layers disposed on a side (e.g., an upstream side or a downstream side) of the filter media. In some embodiments, the outer or cover layer can function as an aesthetic layer. In an exemplary embodiment, the outer cover layer is a planar layer that is mated to the filter media after filtration layers are oriented. The outer cover layer may provide a top surface that is aesthetically pleasing.

The outer or cover layer can function as a strengthening component that provides structural integrity to the filter media to help maintain the orientation of fibers or fiber portions. The outer or cover layer can, in some instances, also function to offer abrasion resistance and/or add stiffness to the media. This is particularly desirable in ASHRAE bag applications where the outermost layer is subject to abrasion during use. A downstream outer or cover layer can have a configuration similar to an upstream outer cover layer, as described herein. In an exemplary embodiment, however, the downstream outer cover layer 18B is the coarsest layer, i.e., it is formed from fibers having an average fiber diameter that is greater than an average fiber diameter of fibers forming all of the other layers of the filter media. One exemplary bottom layer is a spunbond layer, however various other layers can be used having various configurations.

The outer or cover layer can be formed from a variety of materials and can have different forms. For example, in one set of embodiments, the outer or cover layer is a scrim (e.g., a spunbond nonwoven material or a carded nonwoven material). In another set of embodiments, the outer or cover layer is in the form of a mesh. In some embodiments, the outer cover layer is formed from fibers. In general, in embodiments in which the outer or cover layer includes fibers, the outer or cover layer may include a variety of different fiber types and/or sizes. In an exemplary embodiment, an outer or cover layer is formed from fibers having an average fiber diameter that is less than an average fiber diameter of a filtration layer (e.g., an upstream filtration layer, or a downstream filtration layer). In another embodiment, an outer or cover layer is formed from fibers having an average fiber diameter that is greater than an average fiber diameter of a filtration layer (e.g., an upstream filtration layer, or a downstream filtration layer). A combination of two or more outer or cover layers is also possible.

In embodiments in which an outer or cover layer includes fibers, the average fiber diameter may vary. For instance, in some embodiments, the fibers of the outer or cover layer may have an average fiber diameter of between about 15 microns and about 75 microns. In some embodiments, the fibers of the outer or cover layer may have an average fiber diameter of less than or equal to about 75 microns, less than or equal to about 65 microns, less than or equal to about 60 microns, less than or equal to about 50 microns, less than or equal to about 40 microns, less than or equal to about 30 microns, or less than or equal to about 20 microns. In some embodiments, the fibers may have an average fiber diameter of greater than or equal to about 15 microns, greater than or equal to about 20 microns, greater than or equal to about 30 microns, greater than or equal to about 40 microns, greater than or equal to about 50 microns, greater than or equal to about 60 microns, or greater than or equal to about 65 microns. Combinations of the above references ranges are also possible (e.g., an average fiber diameter of greater than or equal to about 20 microns and less than about 75 microns). Other ranges are also possible. Additionally, in embodiments in which more than outer or cover layers are present in a media, each outer or cover layer may have an average fiber diameter having one or more of the above-referenced ranges.

Various materials can also be used to form the fibers of the outer or cover layer, including synthetic and non-synthetic materials. In one exemplary embodiment, an outer or cover layer (e.g., an upstream outer or cover layer and/or a downstream outer or cover layer), is formed from staple fibers, and in particular from a combination of binder fibers and non-binder fibers. One suitable fiber composition is a blend of at least about 20% binder fiber and a balance of non-binder fiber. Other ranges of binder fibers are also possible, including the ranges of binder fibers discussed above with respect to the filtration layers. A variety of types of binder and non-binder fibers can be used to form the outer or cover layer described herein, including those previously discussed above with respect to the filtration layers.

The outer or cover layer can also be formed using various techniques known in the art, including meltblowing, wet laid techniques, air laid techniques, carding, electrospinning, and spunbonding. In an exemplary embodiment, however, an upstream outer or cover layer (e.g., layer 18) is an airlaid layer and a downstream outer cover layer (e.g., layer 18B) is a spunbond layer. The resulting layer can also have a variety of thicknesses, air permeabilities, and basis weights depending upon the requirements of a desired application. In one exemplary embodiment, the outer or cover layer, as measured in a planar configuration, has a thickness in the range of about 2 mil to about 10 mil (e.g., about 3 mil to about 6 mil), an air permeability in the range of about 500 CFM to about 1200 CFM (e.g., about 800 CFM to about 1000 CFM), and a basis weight in the range of about 10 gsm to about 20 gsm (e.g., about 12 gsm to about 16 gsm).

The basis weight of the outer or cover layer can typically be selected as desired. In some embodiments, the basis weight of the outer or cover layer may range from between about 10 and about 20 $g/m^2$. For instance, the basis weight of the outer or cover layer may be between about 12 and about 16 $g/m^2$. In some embodiments, the basis weight of the outer or cover layer may be greater than or equal to about 10 $g/m^2$ (e.g., greater than or equal to about 12 $g/m^2$, greater than or equal to about 16 $g/m^2$, or greater than or equal to about 18 $g/m^2$). In some cases, the basis weight of the outer or cover layer may be less than or equal to about 20 $g/m^2$ (e.g., less than or equal to about 16 $g/m^2$, less than or equal to about 12 $g/m^2$, or less than or equal to about 10 $g/m^2$). Combinations of the above-referenced ranges are also possible (e.g., a basis weight of greater than or equal to about 10 $g/m^2$ and less than or equal to about 20 $g/m^2$). Other ranges are also possible. As determined herein, the basis weight of the outer or cover layer is measured according to the ASTM D-846 standard. Additionally, in embodiments in which more than outer or cover layers are present in a media, each outer or cover layer may have a basis weight having one or more of the above-referenced ranges.

In some embodiments, the thickness of the outer or cover layer may range from between about 2 milliinches (mil) and about 10 mil. For instance, the thickness of the outer or cover layer may range between about 3 mil and about 6 mil. In some embodiments, the thickness may be greater than or equal to about 2 mil (e.g., greater than or equal to about 3 mil, greater than or equal to about 4 mil, greater than or equal to about 6 mil, or greater than or equal to about 8 mil). In some cases, the thickness of the outer or cover layer may be less than or equal to about 10 mil (e.g., less than or equal to about 8 mil, less than or equal to about 6 mil, less than or equal to about 4 mil, less than or equal to about 3 mil, or less than or equal to about 2 mil). Combinations of the above-references ranges are also possible (e.g., a thickness of greater than or equal to about 2 mil and less than or equal to about 10 mil). Other ranges are also possible. Additionally, in embodiments in which more than outer or cover layers are present in a media, each outer or cover layer may have a thickness having one or more of the above-referenced ranges.

The outer or cover layer may exhibit suitable air permeability characteristics. In some embodiments, the air permeability of an outer or cover layer may range from between about 500 CFM and about 1200 CFM (e.g., between about 800 CFM and about 1000 CFM). In some embodiments, the air permeability may be greater than or equal to about 500 CFM, greater than or equal to about 600 CFM, greater than or equal to about 700 CFM, greater than or equal to about 800 CFM, greater than or equal to about 900 CFM, greater than or equal to about 1000 CFM, or greater than or equal to about 1100 CFM. In certain embodiments, the air permeability may be less than or equal to about 1200 CFM, less than or equal to about 1100 CFM, less than or equal to about 1000 CFM, less than or equal to about 900 CFM, less than or equal to about 800 CFM, less than or equal to about 600 CFM, less than or equal to about 700 CFM, less than or equal to about 600 CFM, or less than or equal to about 500 CFM. Combinations of the above-referenced ranges are also possible (e.g., an air permeability of greater than or equal 800 CFM and less than or equal to about 1000 CFM). Other ranges are also possible. Additionally, in embodiments in which more than outer or cover layers are present in a media, each outer or cover layer may have an air permeability having one or more of the above-referenced ranges.

A person skilled in the art will appreciate that, while FIG. 1A illustrates a single filtration layer and FIGS. 1B-1C show filter media including two filtration layers, the media can include any number of layers in various configurations. For instance, in some embodiments, a filter media including one, two, three, four, five, six, seven, or eight filtration layers may be possible, Various layers can be added to enhance filtration, to provide support, to alter structure, or for various other purposes. In certain embodiments, a filter media may include one, two, three, four, five, six, seven, eight, nine, or ten total number of layers, regardless of type, The filtration layers, outer or cover layers, and filter media described herein may also exhibit advantageous filtration performance characteristics such as dust holding capacity (DHC) and efficiency, amongst others.

The filtration layers described herein can have beneficial dust holding properties. In some embodiments, the filtration layer may have a DHC of between about 66 $g/m^2$ and about 200 $g/m^2$ (e.g., a DHC between about 100 $g/m^2$ and about 160 $g/m^2$). In some embodiments, the DHC may be greater than or equal to about 66 $g/m^2$, greater than or equal to about 80 $g/m^2$, greater than or equal to about 100 $g/m^2$, greater than or equal to about 120 $g/m^2$, greater than or equal to about 140 $g/m^2$, greater than or equal to about 160 $g/m^2$, greater than or equal to about 180 $g/m^2$, or greater than or equal to about 190 $g/m^2$. In some cases, the DHC may be less than or equal to about 200 $g/m^2$, less than or equal to about 180 $g/m^2$, less than or equal to about 160 $g/m^2$, less than or equal to about 140 $g/m^2$, less than or equal to about 120 $g/m^2$, less than or equal to about 100 $g/m^2$, less than or equal to about 80 $g/m^2$, or less than or equal to about 66 $g/m^2$. Combinations of the above-referenced ranges are also possible (e.g., a DHC of greater than or equal to about 66 $g/m^2$ and less than or equal to about 200 $g/m^2$). Other ranges are also possible. In some embodiments, a combination of filtration layers may have a combined dust holding capacity in one or more of the above-referenced ranges. Additionally, in embodiments in which more than one filtration layers are present in a media, each filtration layer may have a dust holding capacity having one or more of the above-referenced ranges.

The dust holding capacity, as referred to herein, is tested based on the EN779-2012 standard. The testing uses ASHRAE test dust at a base upstream gravimetric dust level of 70 mg/m². The test is run at a face velocity of 0.944 m³/s (3400 m³/h) until a terminal pressure of 450 Pa.

The filtration layers described herein may have a wide range of average efficiencies. In some embodiments, a filtration layer has an average efficiency for 0.4 micron or larger particles of greater than or equal to about 30%, greater than or equal to about 40%, greater than or equal to about 45%, greater than or equal to about 50%, greater than or equal to about 55%, greater than or equal to about 60%, greater than or equal to about 65%, greater than or equal to about 70%, greater than or equal to about 75%, or greater than or equal to about 80%. Such efficiencies may be achieved when the filtration layer is uncharged. Charging the filtration layer may cause the filtration layer to have even higher average efficiencies, e.g., greater than or equal to about 85%, greater than or equal to about 90%, greater than or equal to about 95%, greater than or equal to about 98%, or greater than or equal to about 99% for 0.4 micron or larger particles. Other efficiencies are also possible. In some embodiments, the filtration layer has an average efficiency of less than or equal to 99.9%, less than or equal to 99.8%, less than or equal to 99.7%, less than or equal to 99.5%, less than or equal to 99%, less than or equal to 98%, less than or equal to 95%, less than or equal to 90%, less than or equal to 85%, less than or equal to 80%, less than or equal to 70%, less than or equal to 60%, or less than or equal to 50% for 0.4 micron or larger particles. In some embodiments, a combination of filtration layers may have an average efficiency in one or more of the above-referenced ranges.

The filter media described herein may also have a wide range of average efficiencies. In some embodiments, the average efficiency of the filter media may be greater than the average efficiency of a filtration layer, because additional layers added to the media (e.g., an outer or cover layer) may help to trap particles, thereby increasing the average efficiency of the overall filter media. In some embodiments, a filter media has an average efficiency for 0.4 micron or larger particles of greater than or equal to about 30%, greater than or equal to about 40%, greater than or equal to about 45%, greater than or equal to about 50%, greater than or equal to about 55%, greater than or equal to about 60%, greater than or equal to about 65%, greater than or equal to about 70%, greater than or equal to about 75%, or greater than or equal to about 80%. Such efficiencies may be achieved when the filter media is uncharged. Charging the filter media may cause the filter media to have even higher average efficiencies, e.g., greater than or equal to about 85%, greater than or equal to about 90%, greater than or equal to about 95%, greater than or equal to about 98%, or greater than or equal to about 99%. Other efficiencies are also possible. In some embodiments, the filter media has an average efficiency of less than or equal to 99.9%, less than or equal to 99.8%, less than or equal to 99.7%, less than or equal to 99.5%, less than or equal to 99%, less than or equal to 98%, less than or equal to 95%, less than or equal to 90%, less than or equal to 85%, less than or equal to 80%, less than or equal to 70%, less than or equal to 60%, or less than or equal to 50%.

The average efficiency of a filtration layer or a filter media, as referred to herein, is tested following the EN779-2012 standard. The testing uses an air flow of 0.944 m³/s (3400 m³/h) and a maximum final test pressure drop of 250 Pa (e.g., for Coarse or G filter media) or a maximum final test pressure drop of 450 Pa (e.g., for Medium, or M, or Fine, or F, filter media). In some embodiments, the filter media described herein is classified as a G1, G2, G3, G4, M5, M6, F7, F8, or F9 filter media. The average efficiency ranges for 0.4 micron or larger particles for these classifications are listed in Table 1. Unless otherwise stated, the testing is performed until a maximum final pressure drop of 450 Pa. The average arrestance of synthetic dust and minimum efficiency are described in the EN779-2012 standard.

TABLE 1

| Group | Class | Final test pressure drop Pa | Average arrestance ($A_m$) of synthetic dust % | Average efficiency ($E_m$) of 0.4 μm particles % | Minimum Efficiency[a] of 0.4 μm particles % |
|---|---|---|---|---|---|
| Coarse | G1 | 250 | 50 ≤ $A_m$ < 65 | — | — |
|  | G2 | 250 | 65 ≤ $A_m$ < 80 | — | — |
|  | G3 | 250 | 80 ≤ $A_m$ < 90 | — | — |
|  | G4 | 250 | 90 ≤ $A_m$ | — | — |
| Medium | M5 | 450 | — | 40 ≤ $E_m$ < 60 | — |
|  | M6 | 450 | — | 60 ≤ $E_m$ < 80 | — |
| Fine | F7 | 450 | — | 80 ≤ $E_m$ < 90 | 35 |
|  | F8 | 450 | — | 90 ≤ $E_m$ < 95 | 55 |
|  | F9 | 450 | — | 95 ≤ $E_m$ | 70 |

Additionally, a filtration layer may have a suitable initial efficiency. In some embodiments, the initial efficiency of a filtration layer increases as a function of particle size, e.g., as shown in the Examples in more detail below. In some embodiments, the initial efficiency may range from about 20% to about 99.999% (e.g., between about 60% to about 99.9%) for 0.3-1.0 micron-sized particles, for 1.0-3.0 micron-sized particles, or 3.0-10.0 micron-sized particles. For instance, in certain embodiments, the initial efficiency of a filtration layer described herein may be at least about 20%, at least about 30%, at least about 35%, at least about 40%, at least about 45%, at least about 50%, at least about 60%, at least about 65%, at least about 70%, at least about 75%, at least about 80%, at least about 85%, at least about 90%, at least about 95%, at least about 99%, at least about 99.9%, or at least about 99.99% for 0.3-1.0 micron-sized particles, for 1.0-3.0 micron-sized particles, or 3.0-10.0 micron-sized particles. In some embodiments, the initial efficiency may be less than or equal to about 99.999%, less than or equal to about 99.99%, less than or equal to about 99.9%, less than or equal to about 99%, less than or equal to about 98%, less than or equal to about 95%, less than or equal to about 90%, less than or equal to about 85%, less than or equal to about 80%, less than or equal to about 75%, less than or equal to about 70%, less than or equal to about 65%, less than or equal to about 60%, less than or equal to about 50%, less than or equal to about 45%, less than or equal to about 40%, less than or equal to about 35%, less than or equal to about 30%, or less than or equal to about 20% for 0.3-1.0 micron-sized particles, for 1.0-3.0 micron-sized particles, or 3.0-10.0 micron-sized particles. Other ranges are also possible.

The filter media described herein may also have a wide range of initial efficiencies. In some embodiments, the initial efficiency of the filter media may be greater than the initial efficiency of a filtration layer, because additional layers added to the media (e.g., an outer or cover layer) may help to trap particles, thereby increasing the initial efficiency of the overall filter media. In some embodiments, the initial efficiency of a filter media increases as a function of particle size, e.g., as shown in the Examples in more detail below. In some embodiments, the initial efficiency of a filter media described herein may range from about 20% to about 99.999% (e.g., between about 60% to about 99.9%) for 0.3-1.0 micron-sized particles, for 1.0-3.0 micron-sized particles, or 3.0-10.0 micron-sized particles. For instance, in certain embodiments, the initial efficiency may be at least about 20%, at least about 30%, at least about 35%, at least about 40%, at least about 45%, at least about 50%, at least about 60%, at least about 65%, at least about 70%, at least about 75%, at least about 80%, at least about 85%, at least about 90%, at least about 95%, at least about 99%, at least about 99.9%, or at least about 99.99% for 0.3-1.0 micron-sized particles, for 1.0-3.0 micron-sized particles, or 3.0-10.0 micron-sized particles. In some embodiments, the initial efficiency may be less than or equal to about 99.999%, less than or equal to about 99.99%, less than or equal to about 99.9%, less than or equal to about 99%, less than or equal to about 98%, less than or equal to about 95%, less than or equal to about 90%, less than or equal to about 85%, efficiency of the filtration layer or filter media for a particle size range such as Range 1 (e.g., 0.30-1.0 micron particles), Range 2 (e.g., 1.0-3.0 micron particles), or Range 3 (e.g., 3.0-10.0 micron particles), as shown in Table 2.

Additionally or alternatively, the filtration layer or filter media described herein may be classified by a MERV (Minimum Efficiency Reporting Value) rating, as shown in Table 2. MERV ratings are generally used by the HVAC (Heating, Ventilating and Air Conditioning) industry to describe a filter's ability to remove particulates from the air. A higher MERV rating means better filtration and greater performance. In some embodiments, a filtration layer or filter media described herein has a MERV rating that is in the range of about 5 to 12 (e.g., between about 8 and 12, between about 6 and 9), however the rating can vary based on the intended use. In some embodiments, a filtration layer or filter media described herein has a MERV rating of at least 5, at least 6, at least 7, at least 8, at least 9, at least 10, at least 11, or at least 12. The MERV rating may be, for example, less than or equal to 15, less than or equal to 14, less than or equal to 13, less than or equal to 12, less than or equal to 11, or less than or equal to 10. Combinations of the above-referenced ranges are possible. Other values are also possible.

TABLE 2

| Standard 52.2 Minimum Efficiency Reporting Value (MERV) | Composite Average Particle Size Efficiency, % in Size Range, μm | | | Average Arrestance %, by Standard 52.1 Method | Minimum Final Resistance | |
|---|---|---|---|---|---|---|
| | Range 1 0.30-1.0 | Range 2 1.0-3.0 | Range 3 3.0-10.0 | | Pa | in. of water |
| 1 | n/a | n/a | $E_3 < 20$ | $A_{avg} < 65$ | 75 | 0.3 |
| 2 | n/a | n/a | $E_3 < 20$ | $65 \leq A_{avg} < 70$ | 75 | 0.3 |
| 3 | n/a | n/a | $E_3 < 20$ | $70 \leq A_{avg} < 75$ | 75 | 0.3 |
| 4 | n/a | n/a | $E_3 < 20$ | $75 \leq A_{avg}$ | 75 | 0.3 |
| 5 | n/a | n/a | $20 \leq E_3 < 35$ | n/a | 150 | 0.6 |
| 6 | n/a | n/a | $35 \leq E_3 < 50$ | n/a | 150 | 0.6 |
| 7 | n/a | n/a | $50 \leq E_3 < 70$ | n/a | 150 | 0.6 |
| 8 | n/a | n/a | $70 \leq E_3$ | n/a | 150 | 0.6 |
| 9 | n/a | $E_2 < 50$ | $85 \leq E_3$ | n/a | 250 | 1.0 |
| 10 | n/a | $50 \leq E_2 < 65$ | $85 \leq E_3$ | n/a | 250 | 1.0 |
| 11 | n/a | $65 \leq E_2 < 80$ | $85 \leq E_3$ | n/a | 250 | 1.0 |
| 12 | n/a | $80 \leq E_2$ | $90 \leq E_3$ | n/a | 250 | 1.0 |
| 13 | $E_1 < 75$ | $90 \leq E_2$ | $90 \leq E_3$ | n/a | 350 | 1.4 |
| 14 | $75 \leq E_1 < 85$ | $90 \leq E_2$ | $90 \leq E_3$ | n/a | 350 | 1.4 |
| 15 | $85 \leq E_1 < 95$ | $90 \leq E_2$ | $90 \leq E_3$ | n/a | 350 | 1.4 |
| 16 | $95 \leq E_1$ | $95 \leq E_2$ | $95 \leq E_3$ | n/a | 350 | 1.4 | less than or equal to about 80%, less than or equal to about 75%, less than or equal to about 70%, less than or equal to about 65%, less than or equal to about 60%, less than or equal to about 50%, less than or equal to about 45%, less than or equal to about 40%, less than or equal to about 35%, less than or equal to about 30%, or less than or equal to about 20% for 0.3-1.0 micron-sized particles, for 1.0-3.0 micron-sized particles, or 3.0-10.0 micron-sized particles. Other ranges are also possible.

The initial efficiency of a filtration layer or filter media, as referred to herein, is tested following the ASHRAE 52.2 standard. The testing uses a test air flow rate of 25 FPM. The test is run at an air temperature of 69° F., a relative humidity of 25%, and a barometric pressure of 29.30 in Hg. The testing also uses a challenge aerosol of atomized KCl particles having a range of particle sizes between 0.3-1.0 microns, 1.0-3.0 microns, or 3.0-10.0 microns.

In certain embodiments, a filtration layer or filter media described herein may be classified by determining the initial The filter media may exhibit suitable air permeability characteristics. In some embodiments, the air permeability of a filter media may range from between about 150 CFM and about 800 CFM (e.g., between about 350 CFM and about 600 CFM). In some embodiments, the air permeability may be greater than or equal to about 150 CFM, greater than or equal to about 200 CFM, greater than or equal to about 250 CFM, greater than or equal to about 300 CFM, greater than or equal to about 310 CFM, greater than or equal to about 350 CFM, greater than or equal to about 500 CFM, greater than or equal to about 600 CFM, or greater than or equal to about 700 CFM. In certain embodiments, the air permeability may be less than or equal to about 800 CFM, less than or equal to about 600 CFM, less than or equal to about 500 CFM, less than or equal to about 350 CFM, less than or equal to about 250 CFM, or less than or equal to about 150 CFM. Combinations of the above-referenced ranges are also possible (e.g., an air permeability of greater than or equal to 310 CFM and less than or equal to about 800

CFM). Other ranges are also possible. As determined herein, the permeability is measured according to the Standard TAPPI T-251.

The pressure drop across the filter media or a filtration layer may vary depending on the particular application of the filter media. In some embodiments, for example, the pressure drop across the filter media or a filtration layer may range from between about 5 Pa and about 30 Pa, or between about 7 Pa and about 15 Pa. In some embodiments, the pressure drop across the filter media or filtration layer may be greater than or equal to about 5 Pa, greater than or equal to about 7 Pa, greater than or equal to about 10 Pa, greater than or equal to about 15 Pa, greater than or equal to about 20 Pa, or greater than or equal to about 25 Pa. In certain embodiments, the pressure drop across the filter media or filtration layer may be less than or equal to about 30 Pa, less than or equal to about 20 Pa, less than or equal to about 15 Pa, less than or equal to about 10 Pa, less than or equal to about 7 Pa, or less than or equal to about 5 Pa. Combinations of the above-referenced ranges are also possible (e.g., a pressure drop of greater than or equal 7 Pa and less than or equal to about 15 Pa). Other ranges are also possible.

The pressure drop is measured as the differential pressure across the filter media or filtration layer when exposed to clean air at a face velocity of approximately 12.7 centimeters per second. As noted above, the face velocity is the velocity of air as it hits the upstream side of the filter media or filtration layer. Values of pressure drop are typically recorded as millimeters of water or Pascals. The values of pressure drop described herein were determined according to EN779-2012 standard.

Some or all of the filtration layers can be formed into a waved configuration using various manufacturing techniques, but in an exemplary embodiment involving a single filtration layer, the filtration layer is positioned on a first moving surface adjacent to a second moving surface, and the filtration layer is conveyed between the first and second moving surfaces that are traveling at different speeds. In an example involving two filtration layers, the filtration layers are positioned adjacent to one another in a desired arrangement from air entering side to air outflow side, and the combined layers are conveyed between first and second moving surfaces that are traveling at different speeds. For instance, the second surface may be traveling at a speed that is slower than the speed of the first surface. In either arrangement, a suction force, such as a vacuum force, can be used to pull the layer(s) toward the first moving surface, and then toward the second moving surface as the layer(s) travel from the first to the second moving surfaces. The speed difference causes the layer(s) to form Z-direction waves as they pass onto the second moving surface, thus forming peaks and troughs in the layer(s). The speed of each surface as well as the ratio of speeds between the two surfaces can be altered to obtain a percentage of fiber orientations as described herein. Generally, a higher ratio of speeds results in a higher percentage of fibers having a more angled orientation with respect to the horizontal, or with respect to a surface (e.g., a planar surface) of the filtration layer or an outer or cover layer. In some embodiments, one or more filtration layers, or a filter media, is formed using a ratio of speeds of at least 1.5, at least 2.5, at least 3.5, at least 4.0, at least 4.5, at least 5.0, at least 5.5, or at least 6.0. In certain embodiments, the ratio of speeds is less than or equal to 10.0, less than or equal to 9.0, less than or equal to 8.0, less than or equal to 7.0, less than or equal to 6.0, less than or equal to 5.0, or less than or equal to 4.0, less than or equal to 3.5, less than or equal to 3.0, or less than or equal to 2.5. Combinations of the above-referenced ranges are also possible. Other ratios are also possible.

The speed of each surface can be also altered to obtain the desired number of waves per inch. The distance between the surfaces can also be altered to determine the amplitude of the peaks and troughs, and in an exemplary embodiment the distance is adjusted between 0 to 2". The properties of the different layers can also be altered to obtain a desired filter media configuration. In an exemplary embodiment the filter media has about 2 to 6 waves per inch, with a height (overall thickness) in the range of about 0.025" to 2", however this can vary significantly depending on the intended application. As shown in FIG. 1A, a single wave W extends from the middle of one peak to the middle of an adjacent peak.

In some embodiments, the periodicity of the filtration layer (e.g., the number of waves per inch) may range between about 10 and about 40 waves per 6 inches (e.g., between about 20 and about 30 waves per 6 inches). In some embodiments, the periodicity of the filtration layer may be greater than or equal to about 10 waves, greater than or equal to about 15 waves, greater than or equal to about 20 waves, greater than or equal to about 25 waves, greater than or equal to about 30 waves, or greater than or equal to about 35 waves per 6 inches. In some embodiments, the periodicity of the filtration layer may be less than or equal to about 40 waves, less than or equal to about 30 waves, less than or equal to about 20 waves, or less than or equal to about 10 waves per 6 inches. Combinations of the above-referenced ranges are also possible (e.g., a periodicity of the filtration layer of greater than or equal to about 20 and less than about 30 waves per 6 inches). Other ranges of periodicities are also possible. Additionally, in embodiments in which one or more filtration layers are present in a media, each filtration layer may have a periodicity having one or more of the above-referenced ranges.

Once the layers are formed into a waved configuration, the waved shape can be maintained by activating the binder fibers to effect bonding of the fibers. A variety of techniques can be used to activate the binder fibers. For example, if bicomponent binder fibers having a core and sheath are used, the binder fibers can be activated upon the application of heat. If monocomponent binder fibers are used, the binder fibers can be activated upon the application of heat, steam and/or some other form of warm moisture. An upstream outer or cover layer 18 (FIG. 1B) and/or a downstream outer cover layer 18B (FIG. 1C) can also be positioned on top of the upstream filtration layer 16 (FIG. 1B) or on the bottom of the downstream filtration layer 14B (FIG. 1C), respectively, and mated, such as by bonding, to the upstream filtration layer 16 or downstream filtration layer 14B simultaneously or subsequently. A person skilled in the art will also appreciate that the layers can optionally be mated to one another using various techniques other than using binder fibers. Other suitable mating techniques include adhesives, needling, hydroentanglement, and chemical binders (resins). The layers can also be individually bonded layers, and/or they can be mated, including bonded, to one another prior to being waved.

A saturant can also optionally be applied to the material prior to drying the material. A variety of saturants can be used with the media described herein to facilitate the forming of the layers at a temperature that is less than the melting temperature of the fibers. Exemplary saturants can include phenolic resins, melamine resins, urea resins, epoxy resins, polyacrylate esters, polystyrene/acrylates, polyvinyl chlorides, polyethylene/vinyl chlorides, polyvinyl acetates, polyvinyl alcohols, and combinations and copolymers thereof that are present in an aqueous or organic solvent.

In other embodiments, the resulting media can also have a gradient in at least one, and optionally all, of the following properties: binder and non-binder fibers composition, fiber diameter, mean flow pore size, basis weight, and saturant content. In some embodiments, such a gradient is formed by the use of more than one filtration layers having different properties. For example, in one embodiment, the media can have a lightweight, lofty, coarse-fibered, lightly bonded and lightly saturated sheet upstream (e.g., a first filtration layer), and a heavier, denser, fine-fibered, heavily bonded and heavily saturated sheet downstream (e.g., a second filtration layer). This allows the coarser particles to be trapped in the upstream layer, preventing early saturation of the bottom layer. The first filtration layer may have a higher dust hold capacity than the second filtration layer, and the second filtration layer may have a higher efficiency than the first filtration layer.

In other embodiments, the upstream-most layer can be lighter and/or loftier than the downstream-most layer. That is, the upstream layer can have a solidity (e.g., the solid volume fraction of fibers in the web), a density of fibers, and/or a basis weight that is less than that of the downstream layer. Additionally, in embodiments where the filter media includes a saturant, the media can have a gradient with respect to the amount of saturant in the upstream-most and downstream-most layers. One skilled in the art will appreciate the variety of properties that the layers of the media can have.

An electrostatic charge can also optionally be imparted to the filter media, or to various layers of the media, to form an electret fiber web. A variety of techniques are well known to impart a permanent dipole to the polymer web in order to form electret filter media. Charging can be effected through the use of AC and/or DC corona discharge units and combinations thereof. The particular characteristics of the discharge are determined by the shape of the electrodes, the polarity, the size of the gap, and the gas or gas mixture. Charging can also be accomplished using other techniques, including friction-based charging techniques.

The filter media can also be pleated after it is formed into the waved configuration, and various exemplary configurations will be discussed in more detail below. A person skilled in the art will appreciate that virtually any pleating technique known in the art can be used to pleat the waved filter media. Typically, a filter media is pleated by forming a plurality of parallel score lines in the media and forming folds at each score line.

As indicated above, the properties of the resulting filter media can vary depending on the configuration of the media and the intended use.

The filter media described herein may have a single layer, or multiple layers. In some embodiments involving multiple layers, a clear demarcation of layers may not always be apparent. For example, the number of layers in the filter media may range between 1 and 10 layers (e.g., between 2 and 4 layers). In some embodiments, the number of layers in the filter media may be greater than or equal to 1, greater than or equal to 2, greater than or equal to 4, greater than or equal to 6, greater than or equal to 8, or greater than or equal to 10. In certain embodiments, the number of layers in the filter media may be less than or equal to 10, less than or equal to 8, less than or equal to 6, less than or equal to 4, or less than or equal to 2. Combinations of the above-referenced ranges may also be possible (e.g., a filter media with a number of layers of greater than or equal to 2 layers and less than or equal to 4 layers). Other ranges of the number of layers in a filter media are also possible.

It should be appreciated that although the parameters and characteristics noted above are described with respect to a filtration layer and/or an outer or cover layer, the same parameters and characteristics (including, in some embodiments, the values and ranges for such parameters and characteristics) may also be applied to the entire filter media. For instance, in some embodiments the basis weight of the filter media may range between about 40 $g/m^2$ and about 500 $g/m^2$ (e.g., between about 80 $g/m^2$ and about 200 $g/m^2$). In some embodiments, the basis weight of the filter media may be greater than or equal to about 40 $g/m^2$ (e.g., greater than or equal to about 60 $g/m^2$, greater than or equal to about 80 $g/m^2$, greater than or equal to about 100 $g/m^2$, greater than or equal to about 200 $g/m^2$, or greater than or equal to about 400 $g/m^2$). In some cases, the basis weight of the filter media may be less than or equal to about 500 $g/m^2$ (e.g., less than or equal to 400 $g/m^2$, less than or equal to about 200 $g/m^2$, less than or equal to about 100 $g/m^2$, less than or equal to about 80 $g/m^2$, less than or equal to about 60 $g/m^2$, or less than or equal to about 40 $g/m^2$). Combinations of the above-referenced ranges are also possible (e.g., a basis weight of greater than or equal to about 80 $g/m^2$ and less than or equal to about 200 $g/m^2$). Other ranges are also possible. As determined herein, the basis weight of the filter media is measured according to the ASTM D-846 standard.

In some embodiments, the thickness of the filter media may range from between about 40 mil and about 1000 mil. For instance, the thickness of the filter media may range between about 80 mil and about 230 mil. In some embodiments, the thickness may be greater than or equal to about 40 mil (e.g., greater than or equal to about 80 mil, greater than or equal to about 100 mil, greater than or equal to about 200 mil, greater than or equal to about 230 mil, greater than or equal to about 500 mil, or greater than or equal to about 800 mil). In some cases, the thickness of the filter media may be less than or equal to about 1000 mil (e.g., less than or equal to about 500 mil, less than or equal to about 230 mil, less than or equal to about 100 mil, less than or equal to about 80 mil, or less than or equal to about 40 mil). Combinations of the above-references ranges are also possible (e.g., a thickness of greater than or equal to about 80 mil and less than or equal to about 230 mil). Other ranges are also possible.

The filter media may exhibit a suitable mean flow pore size. In some embodiments, the mean flow pore size of the filter media may range between about 0.1 microns and about 100 microns (e.g., between about 5 microns and about 40 microns, between about 15 microns and about 40 microns, or between about 25 microns and about 80 microns). In some embodiments, the mean flow pore size of the filter media may be less than or equal to about 100 microns, less than or equal to about 50 microns, less than or equal to about 40 microns, less than or equal to about 30 microns, less than or equal to about 20 microns, less than or equal to about 10 microns, or less than or equal to about 5 microns, or less than or equal to about 2 microns. In other embodiments, the mean flow pore size may be greater than or equal to about 2 microns, greater than or equal to about 5 microns, greater than or equal to about 10 microns, greater than or equal to about 20 microns, greater than or equal to about 25 microns, greater than or equal to about 30 microns, greater than or equal to about 50 microns or greater than or equal to about 75 microns. Combinations of the above-referenced ranges are also possible (e.g., a mean flow pore size of greater than or equal to about 10 microns and less than or equal to about 50 microns). Other values and ranges of mean flow pore size are also possible.

The filter media described herein can have beneficial dust holding properties. In some embodiments, the filter media may have a DHC of between about 66 g/m$^2$ and about 200 g/m$^2$ (e.g., a DHC between about 100 g/m$^2$ and about 160 g/m$^2$). In some embodiments, the DHC may be greater than or equal to about 66 g/m$^2$, greater than or equal to about 80 g/m$^2$, greater than or equal to about 100 g/m$^2$, greater than or equal to about 120 g/m$^2$, greater than or equal to about 140 g/m$^2$, greater than or equal to about 160 g/m$^2$, or greater than or equal to about 180 g/m$^2$. In some cases, the DHC may be less than or equal to about 200 g/m$^2$, less than or equal to about 180 g/m$^2$, less than or equal to about 160 g/m$^2$, less than or equal to about 140 g/m$^2$, less than or equal to about 120 g/m$^2$, less than or equal to about 100 g/m$^2$, less than or equal to about 80 g/m$^2$, or less than or equal to about 66 g/m$^2$. Combinations of the above-referenced ranges are also possible (e.g., a DHC of greater than or equal to about 66 g/m$^2$ and less than or equal to about 200 g/m$^2$). Other ranges are also possible.

As previously indicated, the filter media disclosed herein can be incorporated into a variety of filter elements for use in various applications, including both liquid and air filtration applications. Exemplary uses include ASHRAE bag filters, pleatable HVAC filters, liquid bag filter media, dust bag house filters, residential furnace filters, paint spray booth filters, surgical face masks, industrial face masks, cabin air filters, commercial ASHRAE filters, respirator filters, automotive air intake filters, automotive fuel filters, automotive lube filters, room air cleaner filters and vacuum cleaner exhaust filters. The filter elements can have various configurations, and certain exemplary filter element configurations are discussed in more detail below. Other exemplary filter elements include, by way of non-limiting example, radial filter elements that include cylindrical filter media disposed therein, micron-rater vessel bag filters (also referred to as sock filters) for liquid filtration, face masks, etc.

Figure 2:
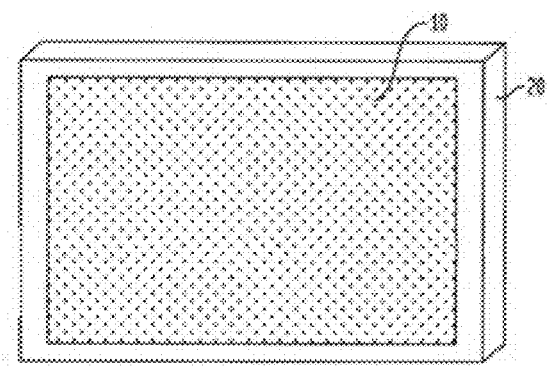
FIG. 2 is a perspective view of one embodiment of a panel filter.

In one exemplary embodiment, the filter media can be used in a panel filter. In particular, a filter media can include a housing disposed thereround. The housing can have various configurations, and the particular configuration can vary based on the intended application. In one embodiment, as shown in FIG. 2, the housing is in the form of a frame 20 that is disposed around the perimeter of a filter media described herein (e.g., filter media 10). In one embodiment, the frame has a generally rectangular configuration such that it surrounds all four sides of a generally rectangular filter media, however the particular shape can vary. The frame can be formed from various materials, including cardboard, metal, polymers, etc. In certain exemplary embodiments, the frame can have a thickness t that is about 12" or less, and more preferably about 2" or less. In another embodiment, the frame can be formed from the edges of the filter media. In particular, a perimeter of the filter media can be thermally sealed to form a frame thereround. The panel filter can also include a variety of other features known in the art, such as stabilizing features for stabilizing the filter media relative to the frame, spacers, etc.

In use, the panel filter element can be used in a variety of applications, including commercial and residential HVAC; automotive passenger cabin air; automotive air intake; and paint spray booth filters. The particular properties of the filter element can vary based on the intended use.

Figure 3A:
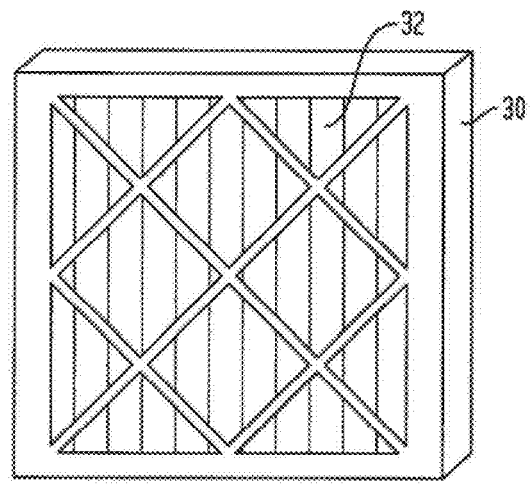
FIG. 3A is a perspective view of one embodiment of a pleated filter element.

The filter media having oriented fiber portions as described herein can also be pleated and used in a pleated filter. As previously discussed, the media, or various layers thereof, can be pleated by forming score lines at a predetermined distance apart from one another, and folding the media. A person skilled in the art will appreciate, however, that other pleating techniques can be used. Once the media is pleated, the media can be incorporated into a housing. FIG. 3A illustrates one embodiment of a pleated filter media 32 that is disposed within a frame 30. The frame can have various shapes and sizes. The media can have any number of pleats depending on the size of the frame and the intended use. In certain exemplary embodiment, the filter media has 1-2 pleats per inch, and a pleat height in the range of about 0.75" to 2". However, some applications utilize peaks having a height up to 12".

Figure 3B:
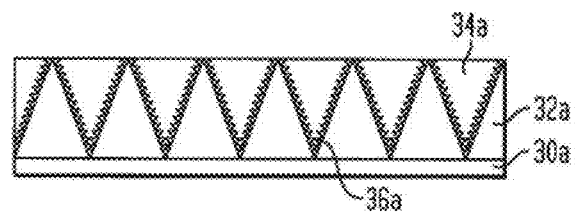
FIG. 3B is a side cross-sectional view of another embodiment of a pleated filter element.
Figure 3C:
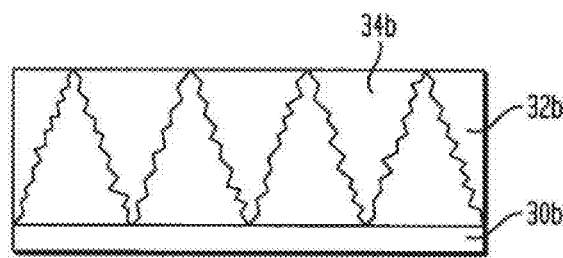
FIG. 3C is a side cross-sectional view of yet another embodiment of a pleated filter element.

In order to facilitate pleating, the filter media can be self-supporting, i.e., it can have a stiffness that allows pleating. In certain exemplary embodiments, the minimum stiffness of the filter media is about 200 mg with Gurley Stiffness tester to enable pleating. Alternatively, or in addition, the filter media can include various stiffening elements. By way of non-limiting example, FIGS. 3B and 3C illustrate a filter media 32a, 32b including a filtration layer described herein (e.g., a waved filtration layer) that is pleated, and that includes a stabilizing strap 34a, 34b that is adhered to (e.g., using an adhesive or other bonding techniques) an air outflow side of the filter media 32a, 32b. The filter media 32a, 32b are also shown disposed within a frame 30a, 30b. FIG. 3B further illustrates a screen backing 36a disposed on the filter media 32a to stiffen the media 32a and help retain the pleated configuration. The screen backing 36a can be an expanded metal wire or an extruded plastic mesh.

In use, the pleated filter element can be used in a variety of applications, including pleatable HVAC filters, residential furnace filters, cabin air filters, commercial ASHRAE filters, automotive air intake filters, automotive fuel filters, automotive lube filters, room air cleaner filters, and vacuum cleaner exhaust filters. The particular properties of the filter element can vary based on the intended use. In some embodiments, the filter media can also have a thickness before pleating of about 0.5" or less (or another thickness range described herein), and a thickness after pleating of about 2" or less. However, in certain application the thickness after pleating can be up to 12".

Figure 4A:
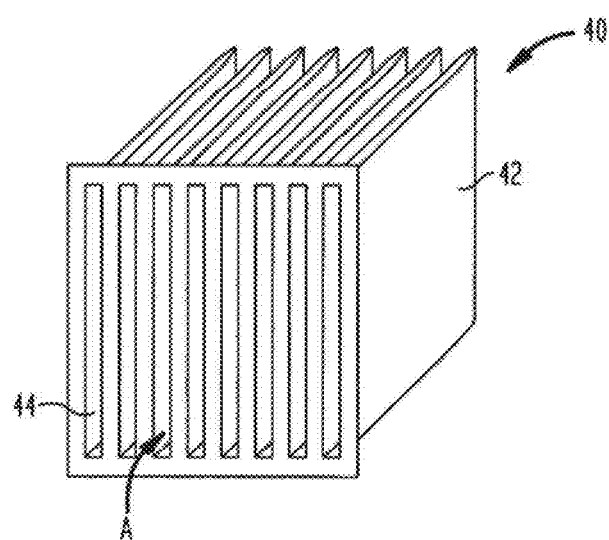
FIG. 4A is a perspective view of one embodiment of a bag filter having multiple filter bags disposed therein.

In yet another embodiment, the filter media can be incorporated into a bag or pocket filter for use in heating, air conditioning, ventilation, and/or refrigeration; and micron rated liquid filter bags. The bag or pocket filter can be formed by placing two filter media together (or folding a single filter media in half), and mating three sides (or two if folded) to one another such that only one side remains opens, thereby forming a pocket inside the filter. As shown in FIG. 4A, multiple filter pockets 42 can be attached to a frame 44 to form a filter element 40. Each pocket 42 can be positioned such that the open end is located in the frame, thus allowing air to flow into each pocket 42 in the direction indicated by line A. The frame can include rectangular rings that extend into and retain each pocket. A person skilled in the art will appreciate that the frame can have virtually any configuration, and various mating techniques known in the art can be used to couple the pockets to the frame. Moreover, the frame can include any number of pockets, but bag filters typically include between 6 and 10 pockets.

Figure 4B:
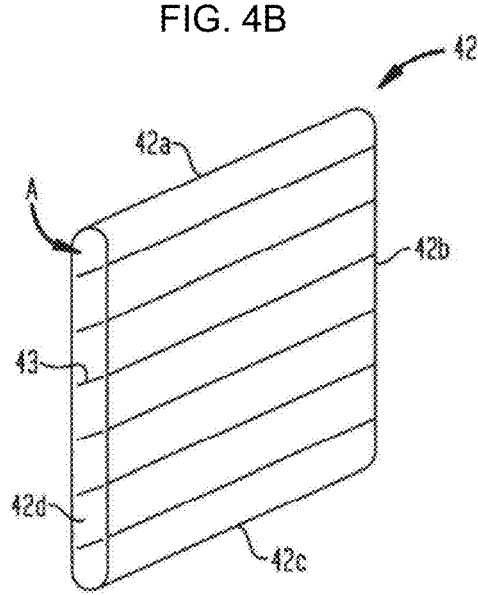
FIG. 4B is a perspective view of one of the filter bags of FIG. 4A.

FIG. 4B illustrates one pocket 42 showing three edges 42a, 42b, 42c being closed and one edge 42d being open for receiving airflow therethrough, as indicated by line A. As further shown in FIG. 4B, the pocket filter 42 can also include any number of spacers 43 disposed therein and configured to retain opposed sidewalls of the filter 42 at a predetermined distance apart from one another. The spacers can be threads or any other element extending between both sidewalls. A person skilled in the art will appreciate that various features known in the art for use with bag or pocket filters can be incorporated into the filter media disclosed herein.

The following non-limiting examples serve to further illustrate the present invention:

EXAMPLES

Example 1

This example demonstrates the properties of four filter media samples comprising a first filtration layer and a second filtration layer. The first filtration layers and the second filtration layers are composed of a blend of three fiber types, polyethylene (PE), polypropylene (PP), and a PE/PP bicomponent (BICO) blend. Fiber type, average fiber diameter, and percentage of each fiber type in the respective layers are shown in Table E1.

TABLE E1

| Fiber Type (Average Diameter) | First Filtration Layer | Second Filtration Layer |
|---|---|---|
| 3.0 D × 2" (PE/PP BICO) (12.75 micron average diameter) | 40% | 40% |
| 2.2 D × 1.5" (PP) (9.3 micron average diameter) | 40% | 30% |
| 6 D × 1.5" (PP) (25.5 micron average diameter) | 20% | 30% |

Four different samples were formed using the two filtration layer composition described above. Each of the four samples (Samples 1-4) were formed at different speed ratios of the moving surfaces carrying each of the first and second filtration layers, as noted in Table E2. The weight, thickness, and resistance of the filtration media samples are also shown in Table E2. As shown in Table E2, the percentage of fiber portions having an orientation between 46-90 degrees, or between 61-90 degrees, generally increased from Sample 1 to Sample 4, with Sample 4 having the highest percentage of fiber portions within this orientation.

TABLE E2

|  | Sample 1 (Ratio 1.5) | Sample 2 (Ratio 2.5) | Sample 3 (Ratio 3.5) | Sample 4 (Ratio 4.0) |
|---|---|---|---|---|
| Fiber portions orientated between 46-90° | 17% | 20% | 43% | 73% |
| Fiber portions orientated between 0-45° | 83% | 80% | 67% | 27% |
| Fiber portions orientated between 61-90° | 6% | 11% | 25% | 55% |
| Fiber portions orientated between 31-60° | 36% | 30% | 35% | 30% |
| Fiber portions orientated between 0-30° | 58% | 59% | 40% | 15% |
| Weight (g/m$^2$) | 104 | 98 | 110 | 140 |
| Thickness (mil) | 150 | 184 | 225 | 230 |
| Resistance (mm w · g) | 0.7 | 0.7 | 0.7 | 0.8 |

Initial efficiency of samples 1-4 as a function of average particle size to be filtered for Range 1 (0.30-1.0 microns), Range 2 (1.0-3.0 microns), and Range 3 (3.0-10.0 micron) particle sizes was measured by the ASHRAE 52.2 standard using aerosolized KCl feed particles of the different sizes. The MERV rating was also measured. Results of the initial efficiency and MERV rating is listed in table E3. The average efficiency for Sample 4 was 40%.

TABLE E3

|  | Sample 1 | Sample 2 | Sample 3 | Sample 4 |
|---|---|---|---|---|
| Range 1 Initial Efficiency (%) | 1 | 2 | 7 | 6 |
| Range 2 Initial Efficiency (%) | 6 | 5 | 12 | 13 |
| Range 3 Initial Efficiency (%) | 27 | 23 | 38 | 43 |
| MERV | 5 | 5 | 6 | 6 |

Figure 5:
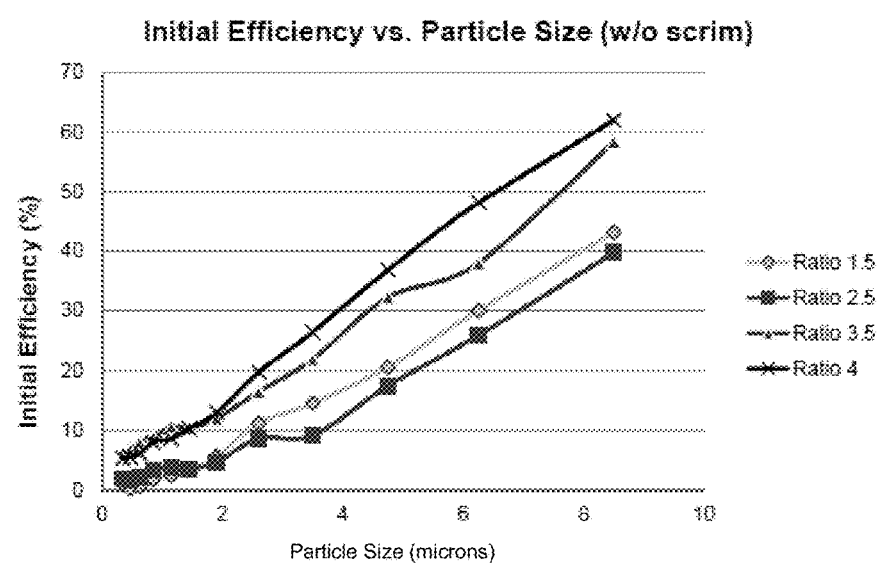
FIG. 5 is a plot of initial efficiency as a function of particle size.
Figure 6A:
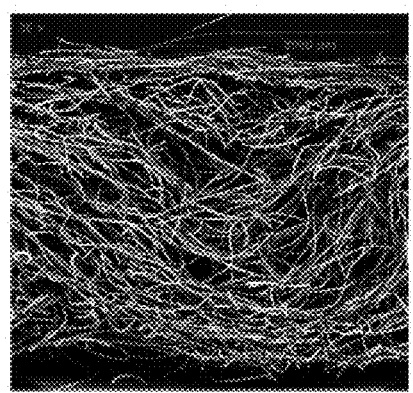
FIG. 6A is a representative SEM cross-sectional image of fibers oriented substantially between 0 degrees and 45 degrees.
Figure 6B:
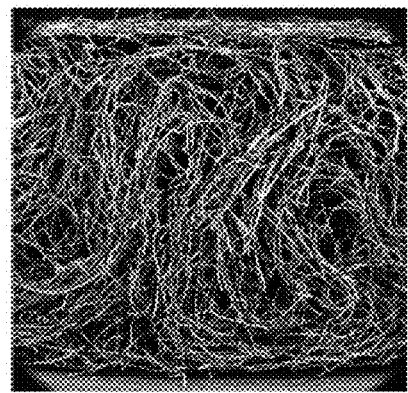
FIG. 6B is a representative SEM cross-sectional image of fibers oriented substantially between 46 degrees and 90 degrees.

As shown in Table E3, as the percentage of fiber portions having an orientation between 46-90 degrees (or between 61-90 degrees) increased (e.g., with Sample 4 having the highest percentage of fiber portions within this orientation), the initial efficiency generally increased. For Samples 1-4, initial efficiency increased as a function of particle size, as shown in FIG. 5. Representative cross-sectional SEM images of Sample 1 and Sample 4 are shown in FIG. 6A and FIG. 6B, respectively.

One skilled in the art will appreciate further features and advantages of the invention based on the above-described embodiments. Accordingly, the invention is not to be limited by what has been particularly shown and described, except as indicated by the appended claims. All publications and references cited herein are expressly incorporated herein by reference in their entirety.

What is claimed is:

1. A filter media, comprising:
    a filtration layer comprising a plurality of fibers including fiber portions, the plurality of fibers having an average fiber diameter of at least 10 microns and less than or equal to 60 microns, the filtration layer having a first surface,
    wherein at least 25% of the fiber portions of the filtration layer are positioned at an angle of between 46 degrees and 90 degrees with respect to the first surface,
    wherein the filtration layer has a basis weight of at least 40 gsm,
    a cover layer adjacent the filtration layer,
    wherein the plurality of fibers are comprised of a synthetic polymer,
    wherein a fine fiber layer having an average fiber diameter of less than 10 microns is absent from the filter media, and
    wherein the filter media has a thickness of at least 0.035 inches.

2. The filter media of claim 1, wherein the basis weight of the filtration layer is between about 80 gsm and 200 gsm.

3. The filter media of claim 1, wherein the filtration layer has a thickness of between about 80 mil and about 230 mil.

4. The filter media of claim 1, wherein the filtration layer has a mean pore flow size of between about 5 microns and about 80 microns.

5. The filter media of claim 1, wherein the filtration layer has an air permeability of between about 350 cfm and about 600 cfm.

6. The filter media of claim 1, wherein the filtration layer is a first filtration layer and the filter media comprises a second filtration layer directly adjacent to the first filtration layer.

7. The filter media of claim 6, wherein the first filtration layer has an average fiber diameter that is different from an average fiber diameter of the second filtration layer.

8. The filter media of claim 1, wherein the synthetic polymer is selected from the group consisting of polyesters, acrylics, polyolefins, nylons, rayons, and polyvinyl derivatives.

9. The filter media of claim 1, wherein the filtration layer comprises staple fibers.

10. The filter media of claim 1, wherein the filtration layer comprises between about 20 wt % and about 70 wt % of binder fibers.

11. The filter media of claim 10, wherein the binder fibers are bicomponent fibers.

12. The filter media of claim 10, wherein the binder fibers are monocomponent fibers.

13. The filter media of claim 12, wherein the filtration layer has a pressure drop across the filtration layer of between about 7 Pa and about 15 Pa.

14. The filter media of claim 1, wherein the filtration layer has an average efficiency for 0.4 micron or larger particles of between about 30% and about 80%, as determined according to standard EN779-2012 using a final pressure drop of 450 Pa.

15. The filter media of claim 1, wherein the filtration layer has an initial efficiency for 3.0-10.0 micron-sized particles of between about 20% to about 90% as determined according to the standard ASHRAE 52.2.

16. The filter media of claim 1, wherein the filter media is classified as an M5 filter media.

17. The filter media of claim 1, wherein the filter media is classified as an M6 filter media.

18. The filter media of claim 1, wherein at least 10% of the fiber portions of the filtration layer are positioned at an angle of between 0 degrees and 30 degrees with respect to the first surface, at least 25% of the fiber portions of the filtration layer are positioned at an angle of between 31 degrees and 60 degrees with respect to the first surface, and at least 40% of the fiber portions of the filtration layer are positioned at an angle of between 61 degrees and 90 degrees with respect to the first surface.

19. The filter media of claim 1, wherein the plurality of fibers comprise a waved configuration including a plurality of peaks and troughs.

20. The filter media of claim 19, wherein the fiber density and/or fiber mass at the peaks is higher than the fiber density and/or fiber mass at the troughs.

21. The filter media of claim 1, wherein the first surface is a planar surface.

22. The filter media of claim 1, wherein the filtration layer has a periodicity of between 10 and 40 waves per 6 inches.

23. A filter media, comprising:
a filtration layer comprising a plurality of fibers including fiber portions, the plurality of fibers having an average fiber diameter of at least 10 microns and less than or equal to 60 microns, the filtration layer having a first surface,
wherein at least 25% of the fiber portions of the filtration layer are positioned at an angle of between 46 degrees and 90 degrees with respect to the first surface,
wherein the filtration layer comprises at least 10 wt % of binder fibers,
wherein the filtration layer has a basis weight of at least 40 gsm,
wherein a fine fiber layer having an average fiber diameter of less than 10 microns is absent from the filter media, and
wherein the filter media has a thickness of at least 0.035 inches.

24. A filter media, comprising:
a filtration layer comprising a plurality of fibers including fiber portions, the plurality of fibers having an average fiber diameter of at least 5 microns and less than or equal to 60 microns, the filtration layer having a first surface,
wherein at least 25% of the fiber portions of the filtration layer are positioned at an angle of between 46 degrees and 90 degrees with respect to the first surface,
wherein the filtration layer has a basis weight of at least 40 gsm,
wherein the plurality of fibers are comprised of a synthetic polymer,
wherein the filter media has an thickness of at least 0.035 inches, and
wherein the filter media has an overall air permeability of between 310 CFM and 800 CFM.

25. A filter media, comprising:
a filtration layer comprising a plurality of fibers including fiber portions, the plurality of fibers having an average fiber diameter of at least 10 microns and less than or equal to 60 microns, the filtration layer having a first surface,
wherein at least 10% of the fiber portions of the filtration layer are positioned at an angle of between 0 degrees and 30 degrees with respect to the first surface, at least 25% of the fiber portions of the filtration layer are positioned at an angle of between 31 degrees and 60 degrees with respect to the first surface, and at least 40% of the fiber portions of the filtration layer are positioned at an angle of between 61 degrees and 90 degrees with respect to the first surface,
wherein the filtration layer has a basis weight of at least 40 gsm,
a cover layer adjacent the filtration layer,
wherein the plurality of fibers are comprised of a synthetic polymer,
wherein a fine fiber layer having an average fiber diameter of less than 10 microns is absent from the filter media, and
wherein the filter media has an thickness of at least 0.035 inches.

* * * * *